(12) United States Patent
Buccola, Jr. et al.

(10) Patent No.: US 10,435,945 B2
(45) Date of Patent: Oct. 8, 2019

(54) COVERING FOR AN ARCHITECTURAL OPENING INCLUDING MULTIPLE STAGE SPRING ASSEMBLY

(71) Applicant: Hunter Douglas Inc., Pearl River, NY (US)

(72) Inventors: Nickolas C. Buccola, Jr., Brighton, CO (US); Kenneth M. Faller, Thornton, CO (US)

(73) Assignee: Hunter Douglas Inc., Pearl River, NY (US)

(*) Notice: Subject to any disclaimer, the term of this patent is extended or adjusted under 35 U.S.C. 154(b) by 553 days.

(21) Appl. No.: 14/937,694

(22) Filed: Nov. 10, 2015

(65) Prior Publication Data

US 2016/0130866 A1    May 12, 2016

Related U.S. Application Data

(60) Provisional application No. 62/077,390, filed on Nov. 10, 2014.

(51) Int. Cl.
*E06B 9/322* (2006.01)
*F03G 1/00* (2006.01)
*E06B 9/34* (2006.01)
*E06B 9/24* (2006.01)
(Continued)

(52) U.S. Cl.
CPC ............. *E06B 9/322* (2013.01); *E06B 9/34* (2013.01); *F03G 1/00* (2013.01); *E06B 2009/2405* (2013.01); *E06B 2009/2452* (2013.01); *E06B 2009/2627* (2013.01); *E06B 2009/405* (2013.01)

(58) Field of Classification Search
CPC .... F16F 1/16; E06B 9/322; E06B 9/34; E06B 2009/2405; E06B 2009/2452; E06B 2009/2627; E06B 2009/405; F03G 1/00
See application file for complete search history.

(56) References Cited

U.S. PATENT DOCUMENTS

| 330,579 | A | * | 11/1885 | Grimm | ............... E06B 9/60 160/303 |
| 1,274,243 | A | | 7/1918 | Chamberlain | |

(Continued)

FOREIGN PATENT DOCUMENTS

| AU | 622268 B2 | 9/1991 |
| CA | 1301052 C | 5/1992 |

(Continued)

OTHER PUBLICATIONS

PCT International Search Report dated Jun. 21, 2013 for International Application No. PCT/NL2013/000009, 3 pages.

(Continued)

*Primary Examiner* — Melody M Burch

(57) ABSTRACT

A covering for an architectural covering is provided. The covering may include a multiple stage spring assembly. The spring assembly may include a non-rotatable first member, a first spring including a first end portion and a second end portion, and a second spring including a first end portion and a second end portion. The first end portion of the first spring may be coupled to the first member. The first end portion of the second spring may be coupled to the second end portion of the first spring to rotate with the second end portion of the first spring.

24 Claims, 14 Drawing Sheets

(51) Int. Cl.
    *E06B 9/262* (2006.01)
    *E06B 9/40* (2006.01)

(56) References Cited

U.S. PATENT DOCUMENTS

| | | | |
|---|---|---|---|
| 1,298,716 A * | 4/1919 | Hoover | F03G 1/00 |
| | | | 15/343 |
| 1,678,590 A | 7/1928 | Dixson | |
| 2,540,742 A | 2/1951 | Langer | |
| 2,674,306 A | 4/1954 | Prieto | |
| 2,722,273 A | 11/1955 | Taylor | |
| 2,842,198 A | 7/1958 | Prieto | |
| 3,099,402 A * | 7/1963 | Speck | F21L 13/06 |
| | | | 320/114 |
| 4,030,567 A | 6/1977 | Kondo | |
| 4,535,830 A | 8/1985 | Appel et al. | |
| 4,766,941 A | 8/1988 | Sloop et al. | |
| 4,884,618 A | 12/1989 | Steeves | |
| 5,044,417 A | 9/1991 | Bresson | |
| 5,105,871 A | 4/1992 | Baud et al. | |
| 5,167,269 A | 12/1992 | Abo | |
| 5,460,216 A | 10/1995 | Hirao et al. | |
| 5,799,716 A | 9/1998 | Yamaguchi et al. | |
| 5,803,150 A | 9/1998 | Boiteau | |
| 5,880,532 A * | 3/1999 | Stopher | B60K 6/10 |
| | | | 290/1 C |
| 5,975,185 A | 11/1999 | Miller et al. | |
| 6,230,785 B1 | 5/2001 | Tokuyama et al. | |
| 6,378,594 B1 | 4/2002 | Yamanaka et al. | |
| 6,536,503 B1 | 3/2003 | Anderson et al. | |
| 6,685,592 B2 | 2/2004 | Fraczek et al. | |
| 7,195,052 B2 | 3/2007 | Nien et al. | |
| 7,237,592 B2 | 7/2007 | Arnoux et al. | |
| 7,726,379 B2 | 6/2010 | Beau | |
| 7,967,051 B2 | 6/2011 | Diaz | |
| 8,258,993 B2 | 9/2012 | Inoue et al. | |
| 8,299,734 B2 | 10/2012 | Mullet et al. | |
| 8,368,328 B2 | 2/2013 | Mullet et al. | |
| 8,776,861 B2 | 7/2014 | Bohlen et al. | |
| 2003/0000657 A1 | 1/2003 | Dupielet et al. | |
| 2004/0226669 A1 | 11/2004 | Webb | |
| 2005/0126723 A1 | 6/2005 | Arnoux et al. | |
| 2008/0060771 A1 | 3/2008 | Sugiyama et al. | |
| 2008/0126723 A1 | 5/2008 | Ashton et al. | |
| 2008/0173499 A1 | 7/2008 | Allsopp | |
| 2008/0289777 A1 | 11/2008 | Costello et al. | |
| 2010/0269988 A1 | 10/2010 | Mullet et al. | |
| 2011/0048655 A1 | 3/2011 | Andreasen et al. | |
| 2011/0297334 A1 | 12/2011 | Bohlen et al. | |
| 2014/0216666 A1 | 8/2014 | Smith et al. | |
| 2015/0034259 A1 | 2/2015 | Bohlen et al. | |

FOREIGN PATENT DOCUMENTS

| | | |
|---|---|---|
| CN | 2203571 Y | 7/1995 |
| CN | 2490940 Y | 5/2002 |
| CN | 2639497 Y | 9/2004 |
| CN | 1643231 A | 7/2005 |
| DE | 3733514 A1 | 4/1989 |
| DE | 4211940 A1 | 10/1993 |
| DE | 19935729 A1 | 2/2001 |
| EP | 0651127 A1 | 5/1995 |
| EP | 1947288 A2 | 7/2008 |
| EP | 2071183 A2 | 6/2009 |
| EP | 2256284 A2 | 12/2010 |
| FR | 403577 | 11/1909 |
| FR | 968255 | 11/1950 |
| GB | 1409891 A | 10/1975 |
| GB | 2166480 A | 5/1986 |
| JP | 5785482 A | 5/1982 |
| JP | 2001040966 A | 2/2001 |
| JP | 2002235488 A | 8/2002 |
| TW | 514152 B | 12/2002 |
| WO | 2005/121487 A1 | 12/2005 |
| WO | 2008/075494 A1 | 6/2008 |
| WO | 2008/141389 A1 | 11/2008 |
| WO | 2010/089118 A1 | 8/2010 |
| WO | 2011/008267 A2 | 1/2011 |

OTHER PUBLICATIONS

International Search Report and Written Opinion dated Feb. 2, 2016, in PCT Application No. PCT/US2015/059995, 10 pages.

* cited by examiner

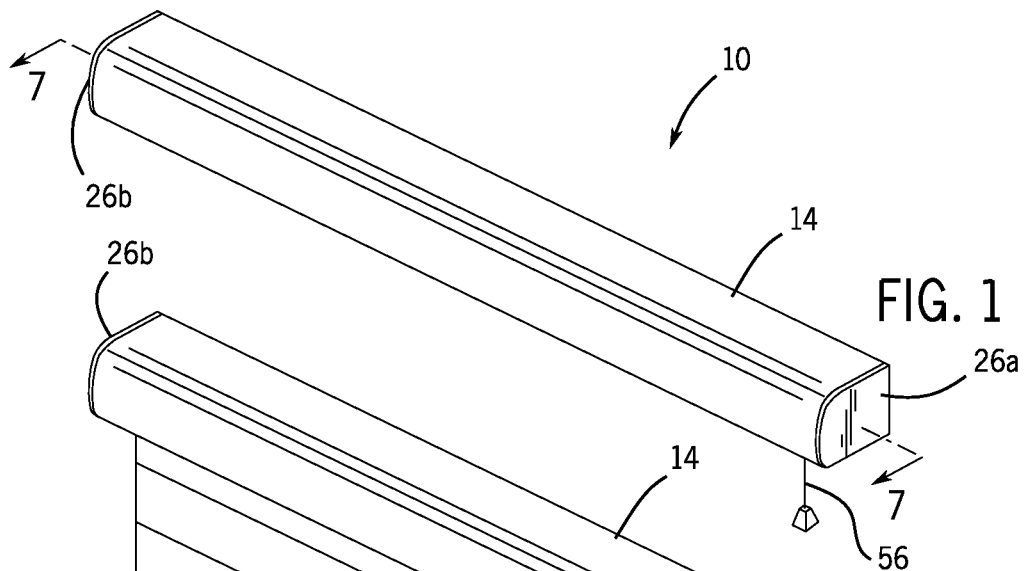
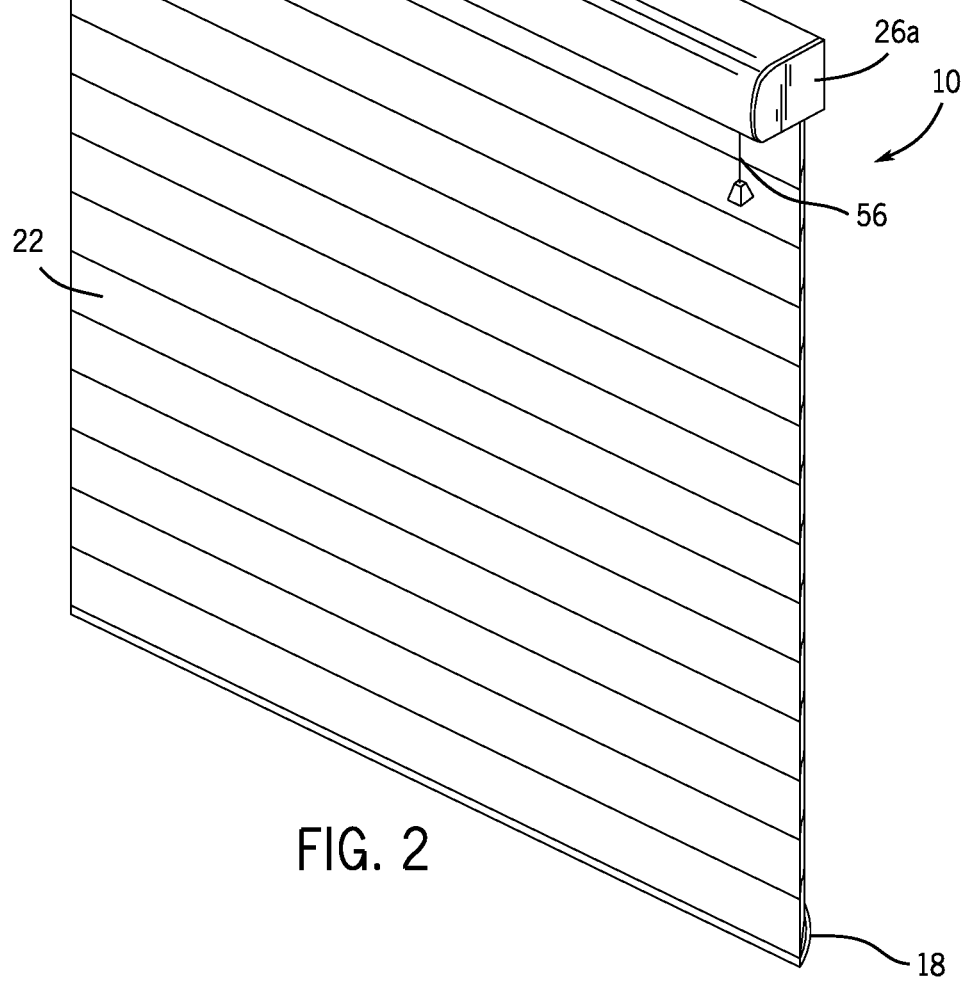

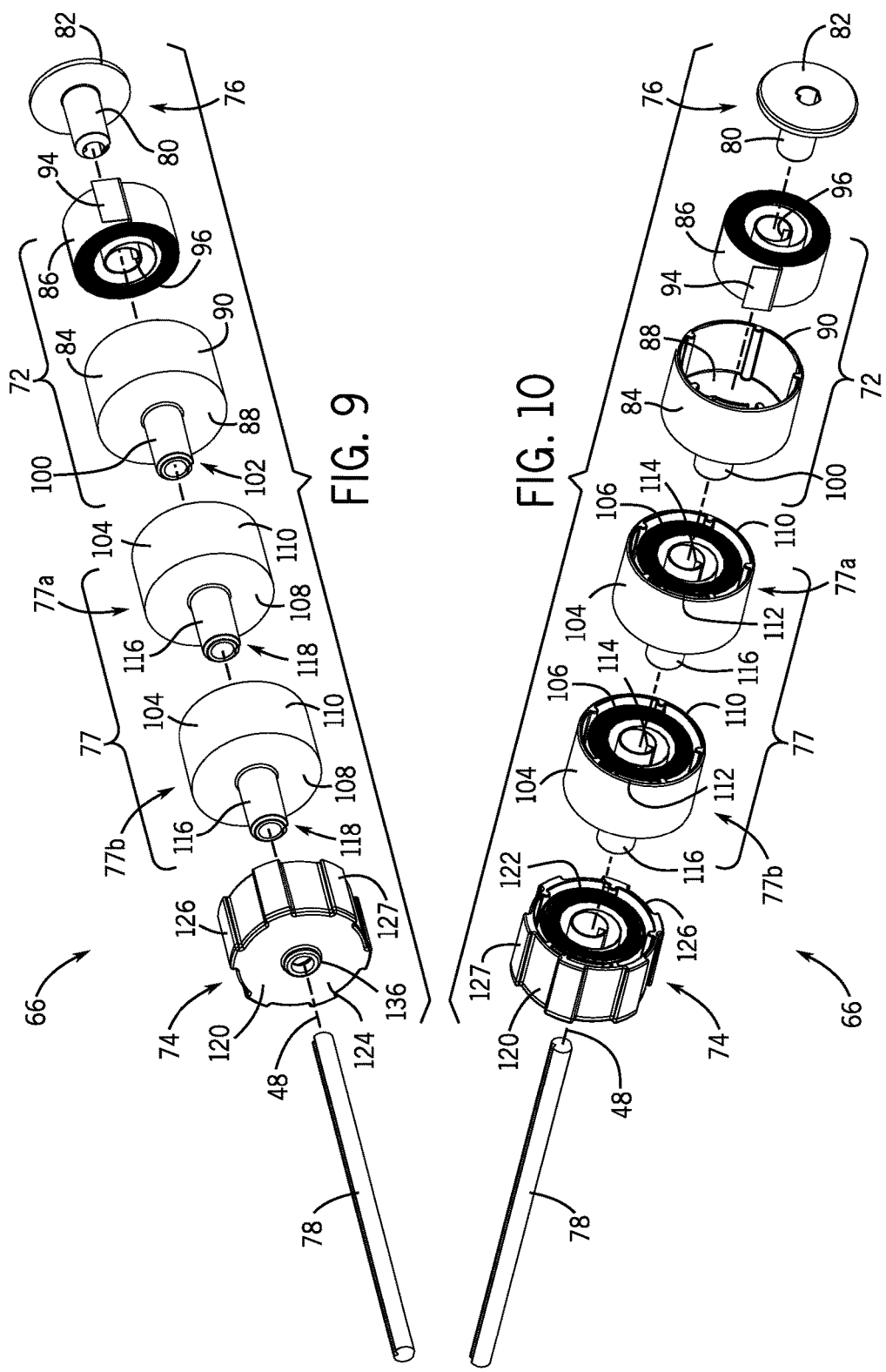

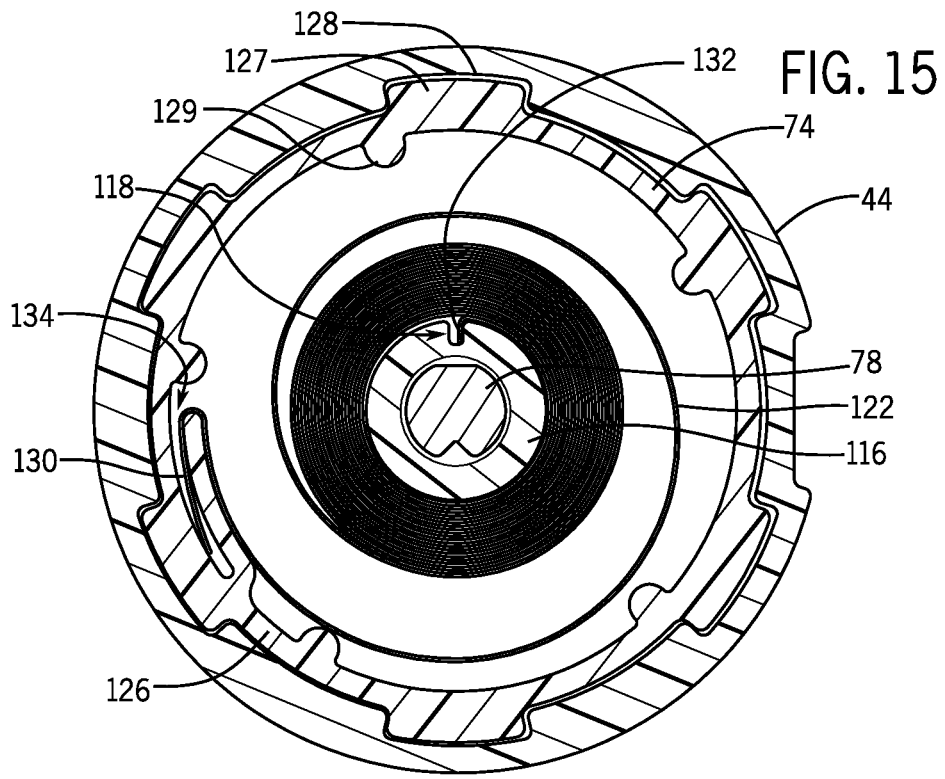
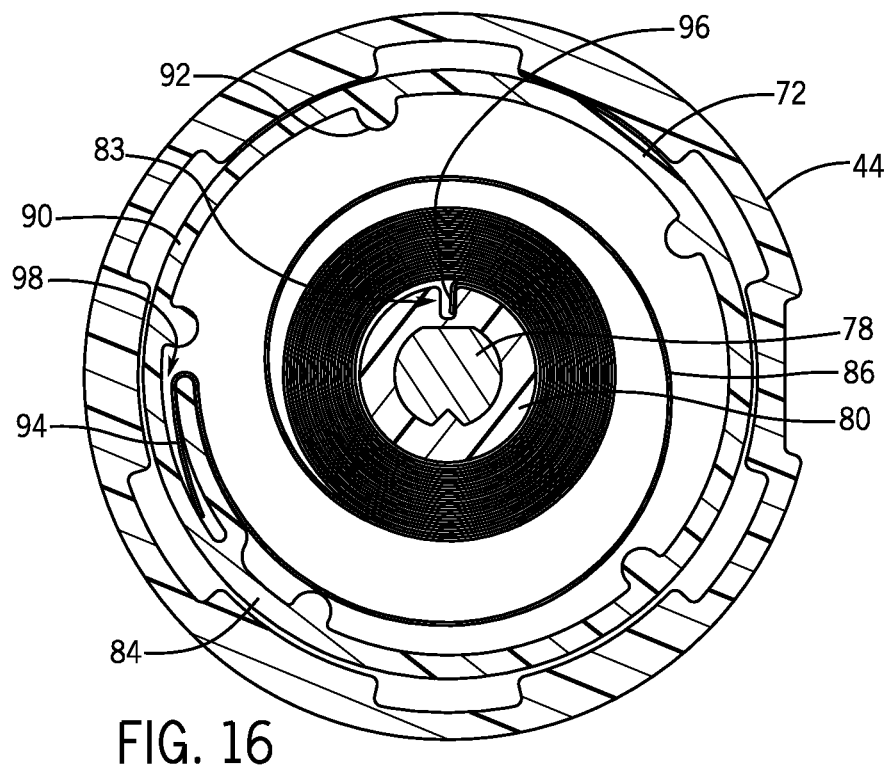

COVERING FOR AN ARCHITECTURAL OPENING INCLUDING MULTIPLE STAGE SPRING ASSEMBLY

CROSS-REFERENCE TO RELATED APPLICATIONS

This application claims the benefit under 35 U.S.C. § 119(e) of U.S. Provisional Application No. 62/077,390, filed Nov. 10, 2014, and entitled "Covering for an Architectural Opening Including Multiple Stage Spring Assembly," which is hereby incorporated by reference herein in its entirety.

FIELD

The present disclosure relates generally to coverings for architectural openings, and more particularly to a covering for an architectural opening including a multiple stage spring assembly.

BACKGROUND

Coverings for architectural openings, such as windows, doors, archways, and the like, have taken numerous forms for many years. Some coverings include a retractable shade that is movable between an extended position and a retracted position. In the extended position, the shade of the covering may be positioned across the opening. In the retracted position, the shade of the covering may be positioned adjacent one or more sides of the opening.

SUMMARY

Embodiments of the disclosure may include a covering for an architectural opening. In a first embodiment, the covering may include a rotatable roller defining an interior space and a spring assembly received at least partially within the interior space of the roller. The spring assembly may include a non-rotatable member, a rotatable first housing, a second housing, a first spring, and a second spring. The first housing may be positioned at least partially between the non-rotatable member and the second housing. The second housing may be coupled to the roller such that the second housing rotates in unison with the roller. The first spring may include a first end portion coupled to the non-rotatable member and a second end portion coupled to the first housing. The second spring may include a first end portion coupled to the first housing and a second end portion coupled to the second housing.

In a second embodiment dependent on the first embodiment, the non-rotatable member, the first housing, and the second housing of the first embodiment are axially aligned with each other.

In a third embodiment dependent on the first embodiment or the second embodiment, the first spring and the second spring are axially aligned with each other.

In a fourth embodiment dependent on any one of the first through third embodiments, the first spring and the second spring are torsion springs.

In a fifth embodiment dependent on any one of the first through fourth embodiments, the first spring and the second spring are spiral-wound torsion springs.

In a sixth embodiment dependent on any one of the first through fifth embodiments, the first spring is positioned radially between a portion of the non-rotatable member and a portion of the first housing.

In a seventh embodiment dependent on any one of the first through sixth embodiments, the second spring is positioned radially between a portion of the first housing and a portion of the second housing.

In an eighth embodiment dependent on any one of the first through seventh embodiments, the first housing defines an interior space, and the first spring is received at least partially within the interior space of the first housing.

In a ninth embodiment dependent on any one of the first through eighth embodiments, the second housing defines an interior space, and the second spring is received at least partially within the interior space of the second housing.

In a tenth embodiment dependent on any one of the first through ninth embodiments, the non-rotatable member defines an axially-extending sleeve, and the first spring is positioned at least partially around the sleeve of the non-rotatable member.

In an eleventh embodiment dependent on the tenth embodiment, the first end portion of the first spring is coupled to the sleeve of the non-rotatable member.

In a twelfth embodiment dependent on the tenth embodiment, the sleeve of the non-rotatable member is positioned at least partially within an interior space defined by the first housing.

In a thirteenth embodiment dependent on any one of the first through twelfth embodiments, the first housing defines an axially-extending sleeve, and the second spring is positioned at least partially around the sleeve of the first housing.

In a fourteenth embodiment dependent on the thirteenth embodiment, the first end portion of the second spring is coupled to the sleeve of the first housing.

In a fifteenth embodiment dependent on the thirteenth embodiment, the sleeve of the first housing is positioned at least partially within an interior space defined by the second housing.

In a sixteenth embodiment dependent on any one of the first through fifteenth embodiments, the second housing has a larger outer dimension than the non-rotatable member and the first housing.

In a seventeenth embodiment dependent on any one of the first through sixteenth embodiments, the covering further includes a speed governor received at least partially within the interior space of the roller.

In an eighteenth embodiment dependent on the seventeenth embodiment, the covering further includes a one-way clutch received at least partially within the interior space of the roller and positioned between the speed governor and the spring assembly.

In a nineteenth embodiment dependent on the eighteenth embodiment, the speed governor, the clutch, and the spring assembly are axially aligned with each other.

In a twentieth embodiment dependent on any one of the first through nineteenth embodiments, the covering further includes a shade attached to the roller.

In a twenty-first embodiment, the covering may include a rotatable roller defining an interior space and a spring assembly received at least partially within the interior space of the roller. The spring assembly may include a non-rotatable shaft, a first stage, and a second stage. The first stage may be coupled to the non-rotatable shaft. Optionally, the first stage may be received onto the non-rotatable shaft. The first stage may include a first spring having a first tang and a second tang. The first tang of the first spring may be non-rotatably coupled to the non-rotatable shaft. The second tang of the first spring may be rotationally movable relative to the non-rotatable shaft. The second stage is coupled with the first stage and the roller. The second stage may be received onto the non-rotatable shaft axially adjacent the first stage. The second stage may include a second spring having a first tang and a second tang. The first tang of the second spring may be operably coupled to the second tang of the first stage such that the first tang of the second spring and the second tang of the first stage rotate together about the non-rotatable shaft. The second tang of the second stage may be operably coupled to the roller such that the second tang of the second stage rotates in unison with the roller.

In a twenty-second embodiment dependent on the twenty-first embodiment, the first stage further includes a first housing non-rotatably coupled to the second tang of the first stage and the first tang of the second stage.

In a twenty-third embodiment dependent on the twenty-first embodiment or the twenty-second embodiment, the second stage further includes a second housing non-rotatably coupled to the second tang of the second stage and the roller.

Embodiments of the disclosure may include a multiple stage spring assembly. In a twenty-fourth embodiment, the spring assembly includes a non-rotatable first member, a rotatable second member, a rotatable third member, a first spring, and a second spring. The second member may be positioned at least partially between the first member and the third member. The first spring may include a first end portion coupled to the first member and a second end portion coupled to the second member. The second spring may include a first end portion coupled to the second member and a second end portion coupled to the third member.

In a twenty-fifth embodiment dependent on the twenty-fourth embodiment, the first member, the second member, and the third member are axially aligned with each other.

In a twenty-sixth embodiment dependent on the twenty-fourth embodiment or the twenty-fifth embodiment, the first spring and the second spring are axially aligned with each other.

In a twenty-seventh embodiment dependent on any one of the twenty-fourth through twenty-sixth embodiments, the first spring and the second spring are torsion springs.

In a twenty-eighth embodiment dependent on any one of the twenty-fourth through twenty-seventh embodiments, the first spring and the second spring are spiral-wound torsion springs.

In a twenty-ninth embodiment dependent on any one of the twenty-fourth through twenty-eighth embodiments, the first spring is positioned radially between a portion of the first member and a portion of the second member.

In a thirtieth embodiment dependent on any one of the twenty-fourth through twenty-ninth embodiments, the second spring is positioned radially between a portion of the second member and a portion of the third member.

In a thirty-first embodiment dependent on any one of the twenty-fourth through thirtieth embodiments, the second member defines an interior space, and the first spring is received at least partially within the interior space of the second member.

In a thirty-second embodiment dependent on any one of the twenty-fourth through thirty-first embodiments, the third member defines an interior space, and the second spring is received at least partially within the interior space of the third member.

In a thirty-third embodiment dependent on any one of the twenty-fourth through thirty-second embodiments, the first member defines an axially-extending sleeve, and the first spring is positioned at least partially around the sleeve of the first member.

In a thirty-fourth embodiment dependent on the thirty-third embodiment, the first end portion of the first spring is coupled to the sleeve of the first member.

In a thirty-fifth embodiment dependent on the thirty-third embodiment, the sleeve of the first member is positioned at least partially within an interior space defined by the second member.

In a thirty-sixth embodiment dependent on any one of the twenty-fourth through thirty-fifth embodiments, the second member defines an axially-extending sleeve, and the second spring is positioned at least partially around the sleeve of the second member.

In a thirty-seventh embodiment dependent on the thirty-sixth embodiment, the first end portion of the second spring is coupled to the sleeve of the second member.

In a thirty-eighth embodiment dependent on the thirty-sixth embodiment, the sleeve of the second member is positioned at least partially within an interior space defined by the third member.

In a thirty-ninth embodiment dependent on any one of the twenty-fourth through thirty-eighth embodiments, the third member has a larger outer dimension than the first member and the second member.

In a fortieth embodiment, the spring assembly includes a non-rotatable shaft, a first stage, and a second stage. The first stage may be received onto the non-rotatable shaft. The first stage may include a first spring having a first tang and a second tang. The first tang may be non-rotatably coupled to the non-rotatable shaft. The second tang may be rotationally movable relative to the non-rotatable shaft. The second stage may be received onto the non-rotatable shaft axially adjacent the first stage. The second stage may include a second spring having a first tang and a second tang. The first tang of the second spring may be operably coupled to the second tang of the first spring such that the first tang of the second spring and the second tang of the first spring rotate together about the non-rotatable shaft. The second tang of the second spring may be rotationally movable relative to the first tang of the second spring.

In a forty-first embodiment dependent on the fortieth embodiment, the first stage further includes a first housing non-rotatably coupled to the second tang of the first spring and the first tang of the second spring.

In a forty-second embodiment dependent on the fortieth embodiment or the forty-first embodiment, the second stage further includes a second housing non-rotatably coupled to the second tang of the second spring.

Embodiments of the disclosure may include a method of assembling a covering for an architectural opening. In a forty-third embodiment, the method includes coupling a first end portion of a first spring to a non-rotatable member, coupling a second end portion of the first spring to a rotatable first housing, coupling a first end portion of a second spring to the first housing, coupling a second end portion of the second spring to a second housing, and inserting the non-rotatable member, the first spring, the first housing, the second spring, and the second housing at least partially within an interior space of a roller.

In a forty-fourth embodiment dependent on the forty-third embodiment, the method further includes inserting the first spring at least partially within an interior space of the first housing.

In a forty-fifth embodiment dependent on the forty-third embodiment or the forty-fourth embodiment, the method further includes positioning the first spring at least partially around a sleeve of the non-rotatable member.

In a forty-sixth embodiment dependent on any one of the forty-third through forty-fifth embodiments, the method further includes inserting the second spring at least partially within an interior space of the second housing.

In a forty-seventh embodiment dependent on any one of the forty-third through forty-sixth embodiments, the method further includes positioning the second spring at least partially around a sleeve of the first housing.

In a forty-eighth embodiment dependent on any one of the forty-third through forty-seventh embodiments, the method further includes coupling the second housing to the roller so that the second housing rotates in unison with the roller.

In a forty-ninth embodiment dependent on any one of the forty-third through forty-eighth embodiments, the method further includes axially aligning the non-rotatable member, the first housing, and the second housing.

In a fiftieth embodiment dependent on any one of the forty-third through forty-ninth embodiments, the method further includes axially aligning the first spring and the second spring.

In a fifty-first embodiment, the method includes coupling a first end portion of a first spring to a first member, coupling a second end portion of the first spring to a second member, coupling a first end portion of a second spring to the second member, coupling a second end portion of the second spring to a third member, and inserting the first spring, the first member, the second member, the second spring, and the third member at least partially within an interior space of a roller.

In a fifty-second embodiment dependent on the fifty-first embodiment, the method further includes inserting the first spring at least partially within an interior space of the second member.

In a fifty-third embodiment dependent on the fifty-first embodiment or the fifty-second embodiment, the method further includes positioning the first spring at least partially around a sleeve of the first member.

In a fifty-fourth embodiment dependent on any one of the fifty-first through fifty-third embodiments, the method further includes inserting the second spring at least partially within an interior space of the third member.

In a fifty-fifth embodiment dependent on any one of the fifty-first through fifty-fourth embodiments, the method further includes positioning the second spring at least partially around a sleeve of the second member.

In a fifty-sixth embodiment dependent on any one of the fifty-first through fifty-fifth embodiments, the method further includes coupling the third member to the roller such that the third member rotates in unison with the roller.

In a fifty-seventh embodiment dependent on any one of the fifty-first through fifty-sixth embodiments, the method further includes axially aligning the first member, the second member, and the third member.

In a fifty-eighth embodiment dependent on any one of the fifty-first through fifty-seventh embodiments, the method further includes axially aligning the first spring and the second spring.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements described or illustrated herein.

BRIEF DESCRIPTION OF THE DRAWINGS

The accompanying drawings, which are incorporated into and constitute a part of the specification, illustrate embodiments of the disclosure and, together with the general description given above and the detailed description given below, serve to explain the principles of these embodiments.

FIG. 1 is an isometric view of a covering with first and second shades in fully-retracted positions in accordance with some embodiments of the present disclosure.

FIG. 2 is an isometric view of the covering of FIG. 1 with a first shade in a partially-extended position and a second shade in a fully-retracted position in accordance with some embodiments of the present disclosure.

FIG. 9 is an isometric, partially-exploded view of the spring assembly of FIG. 8 in accordance with some embodiments of the present disclosure.

FIG. 10 is another isometric, partially-exploded view of the spring assembly of FIG. 8 in accordance with some embodiments of the present disclosure.

In FIG. 11, the spring assembly is positioned in an unwound configuration within a roller of the covering of FIG. 1 in accordance with some embodiments of the present disclosure.

In FIG. 14, the spring assembly is positioned in a wound configuration within a roller of the covering of FIG. 1 in accordance with some embodiments of the present disclosure.

FIG. 15 is a transverse cross-sectional view of a stage of the spring assembly of FIG. 8 taken along line 15-15 of FIG. 14 in accordance with some embodiments of the present disclosure.

FIG. 16 is a transverse cross-sectional view of another stage of the spring assembly of FIG. 8 taken along line 16-16 of FIG. 14 in accordance with some embodiments of the present disclosure.

DETAILED DESCRIPTION

Figure 3:
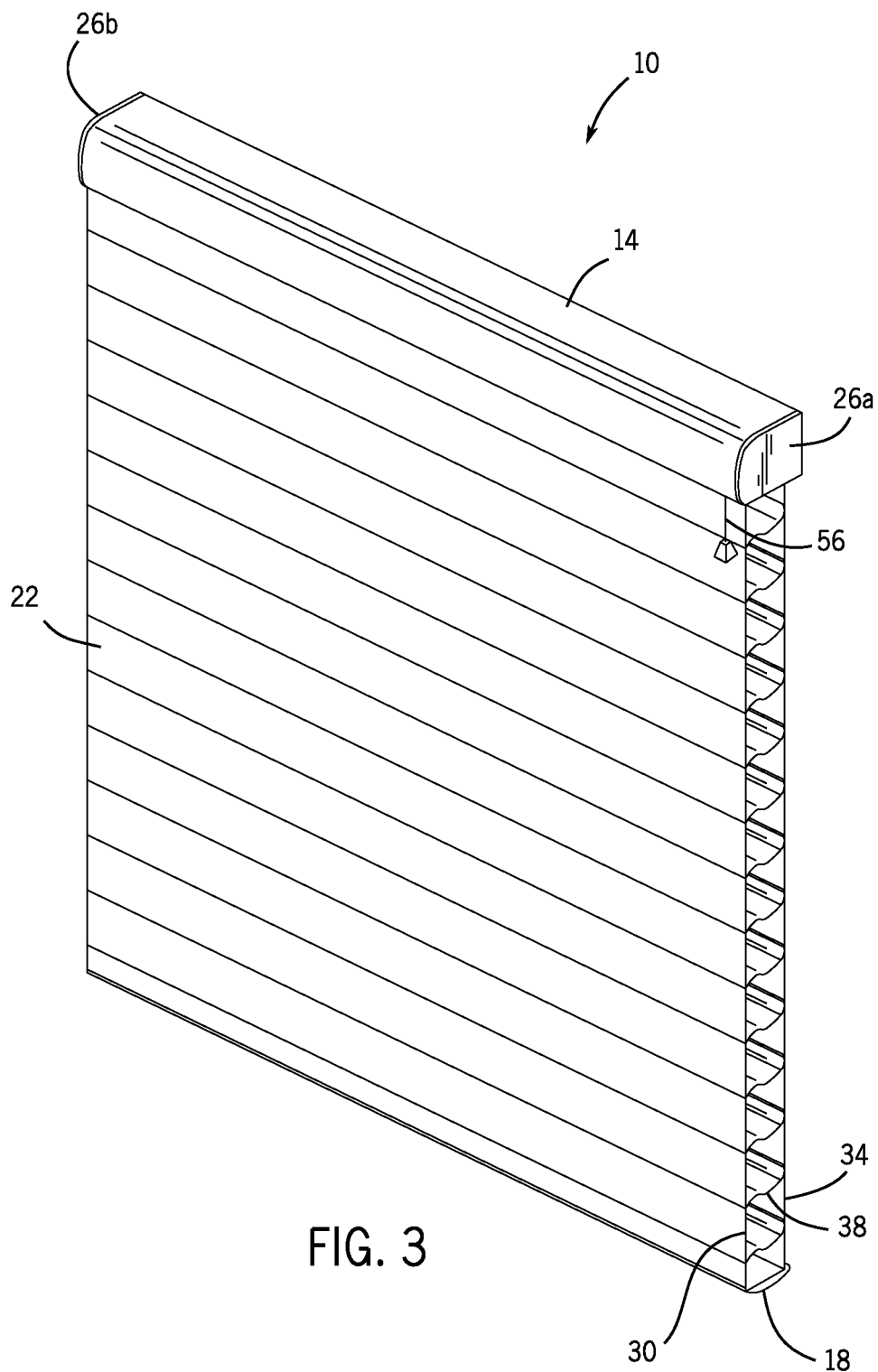
FIG. 3 is an isometric view of the covering of FIG. 1 with a first shade in a fully-extended position and a second shade in a fully-retracted position in accordance with some embodiments of the present disclosure.

The present disclosure provides a covering for an architectural opening. More particularly, the present invention provides a spring assembly that may assist in extension of a covering for an architectural opening. The covering may include a first shade and a second shade operably coupled to a pair of nested rollers, as shown in the illustrative Figures. However, it will be appreciated that principles of the disclosed spring assembly are applicable to a variety of coverings for architectural openings or other types of shades, and need not be limited by the examples described herein and/or shown in the drawings. In the illustrated embodiment, the first shade may be engaged with an outer roller for retraction onto and extension therefrom by wrapping around and unwrapping from the outer roller as actuated by a user. The second shade may be engaged with an inner roller for retraction onto and extension therefrom by wrapping around and unwrapping from the inner roller as actuated by the user. The inner roller may be positioned inside the outer roller and collectively the inner and outer rollers may form a dual roller unit, as further described below.

The covering may include a spring assembly to assist extension of the first shade, the second shade, or both. The spring assembly may be operably coupled with the inner roller, the outer roller, or both. In some implementations, the spring assembly is positioned within an interior space of the inner roller, which may have an inner diameter of about one inch or less. During extension of the first shade, the second shade, or both, the spring assembly may apply the rotational force or torque to the inner roller to assist deployment of the first shade, the second shade, or both. During retraction of the first shade, the second shade, or both, the inner roller may wind the spring assembly and reset the spring assembly to a preloaded state. In other words, during retraction of the first shade, the second shade, or both, a rotational force or torque may be transferred through the inner roller to the spring assembly and stored within the spring assembly as potential energy.

The spring assembly may provide a desired number of spring-powered revolutions to accommodate various heights (for vertically-extending coverings) or widths (for horizontally-extending coverings) of architectural openings. The spring assembly may include multiple stages attached in series to increase the number of turns of the spring assembly. The increased number of turns may enable the spring assembly to provide a substantially constant operating torque during the extension, the retraction, or both of the first shade, the second shade, or both across the architectural opening. The increased number of turns may increase the amount of potential energy the spring assembly may absorb during retraction of the first shade, the second shade, or both across the architectural opening.

The length of the spring assembly may extend axially along a rotational axis of an associated roller. The length of the spring assembly may be altered by adding or removing stages to assist operation of an architectural covering having a larger or smaller effective shade length, respectively. For architectural coverings with a larger effective shade length (in a travel direction of a shade), the spring assembly may include additional or intermediate stages to increase the number of turns of the spring assembly. The additional or intermediate stages may be disposed axially adjacent one another along a rotation axis of a roller of the covering, thereby increasing the axial length of the spring assembly without impacting the radial or transverse dimension of the spring assembly. Thus, the spring assembly is adjustable to control extension and retraction of longer than average shades, for example across tall architectural openings. For architectural coverings with a smaller effective shade length, the spring assembly may include fewer stages to decrease the number of turns of the spring assembly. Adding or removing stages of the spring assembly generally does not impact the radial or transverse envelope of the spring assembly.

The spring assembly may include at least two stages. A first stage may be coupled to a non-rotatable or rotationally-fixed structure of the covering. A second stage may be coupled to the roller and may be rotatable relative to the rotationally-fixed structure. The first and second stages may be coupled to one another such that the second stage is rotationally coupled to the rotationally-fixed structure through the first stage. The first stage and the second stage may be axially aligned with one another along a rotation axis of the inner roller, the outer roller, or both. In some implementations, the first stage and the second stage are positioned alongside one another (e.g., end-to-end) within an interior space of the inner roller. The spring assembly may include additional or intermediate stages between the first and second stages, which may increase the axial length of the spring assembly and the number of turns of the spring assembly. The increase in the axial length of the spring assembly and the number of turns of the spring assembly may permit further extension of a shade (e.g., permit extension of a shade that is longer than average).

The spring assembly may include a non-rotatable first member (e.g., an arbor, a non-rotatable shaft, or both), a rotatable second member (e.g., a first spring housing), and a third member (e.g., a second spring housing) coupled to the inner roller such that the third member rotates in unison with the inner roller. The second member may be positioned at least partially between the first member and the third member. The first and second members may be connected together by a first spring, and the second and third members may be connected together by a second spring. The first member, the second member, and the third member may be sufficiently rigid to resist deformation during operation of the spring assembly. In some embodiments, the first, second, and third members are formed of a non-metallic material and the first and second springs are formed of a metallic material. In some embodiments, the first, second, and third members are formed of molded plastic. In some embodiments, the first, second, and third members are formed of an ultraviolet resistant material, such as Celcon® M90-45H, which is an acetal copolymer. In some embodiments, the first and second springs are formed of stainless steel. In some embodiments, the first and second springs are formed of 301 stainless steel, full hard or high yield.

During retraction of the first shade, the second shade, or both, the inner roller may rotate the third member of the spring assembly about a rotation axis of the roller. The rotation of the third member may wind the second spring, which in turn may apply a torque to the second member and rotate the second member about the rotation axis of the roller. The rotation of the second member may wind the first spring, one end of which may be attached to the rotationally-fixed first member. Continued retraction of the first shade, the second shade, or both may continue to wind the first and second springs. The first and second springs may store potential energy during the winding process (e.g., retraction of the first shade, the second shade, or both).

During extension of the first shade, the second shade, or both, the third member of the spring assembly may rotate the inner roller about the rotation axis of the roller under the bias of the first spring, the second spring, or both. The second spring may apply a torque to the third member. Additionally, or alternatively, the first spring may apply a torque to the second member, which in turn may apply a torque to the third member through the second spring. Additional or intermediate stages of the spring assembly may be added by adding additional members (e.g., spring housings) and springs. The additional or intermediate stages of the spring assembly may increase the number of spring-powered turns of the spring assembly without changing the radial or transverse envelope of the spring assembly.

Referring to FIGS. 1-5, a retractable covering 10 for an architectural opening is provided. The retractable covering 10 may include a head rail 14, a first bottom rail 18, a second bottom rail 20, a first shade 22, and a second shade 24. The first shade 22 may extend between the head rail 14 and the first bottom rail 18. The second shade 24 may extend between the head rail 14 and the second bottom rail 20. The first bottom rail 18 may extend horizontally along a lower edge of the first shade 22 and may function as a ballast to maintain the first shade 22 in a taut condition. The second bottom rail 20 may extend horizontally along a lower edge of the second shade 24 and may function as a ballast to maintain the second shade 24 in a taut condition. The head rail 14 may include two opposing end caps 26a, 26b, which may enclose the ends of the head rail 14 to provide a finished appearance.

The first shade 22 may include vertically suspended front 30 and rear 34 sheets of flexible material (e.g., sheer fabric) and a plurality of horizontally-extending, vertically-spaced vanes 38. Each of the vanes 38 may be secured along horizontal lines of attachment with a front edge attached to the front sheet 30 and a rear edge attached to the rear sheet 34. The sheets 30, 34 and vanes 38 may form a plurality of elongated, vertically-aligned, longitudinally-extending cells. The sheets 30, 34 and/or the vanes 38 may be constructed of continuous lengths of material or may be constructed of strips of material attached or joined together in an edge-to-edge, overlapping, or other suitable relationship. The second shade 24 may be a single panel and may be constructed of a continuous length of material or of strips of material attached or joined together in an edge-to-edge, overlapping, or other suitable relationship.

The first and second shades 22, 24 may be constructed of substantially any type of material. For example, the shades 22, 24 may be constructed from natural and/or synthetic materials, including fabrics, polymers, and/or other suitable materials. Fabric materials may include woven, non-woven, knits, or other suitable fabric types. The shades 22, 24 may have any suitable level of light transmissivity. For example, the first and second shades 22, 24 may be constructed of transparent, translucent, and/or opaque materials to provide a desired ambience or décor in an associated room. In some embodiments, the first shade 22 includes sheets 30, 34 that are transparent and/or translucent, and vanes 38 that are translucent and/or opaque. In some embodiments, the second shade 24 is made of a single sheet of material with zero light transmissivity, often referred to as a black-out shade. The second shade 24 may include patterns or designs so that when the second shade 24 is extended behind the first shade 22, the second shade 24 creates a different aesthetic appearance than the first shade 22 by itself.

Figure 6:
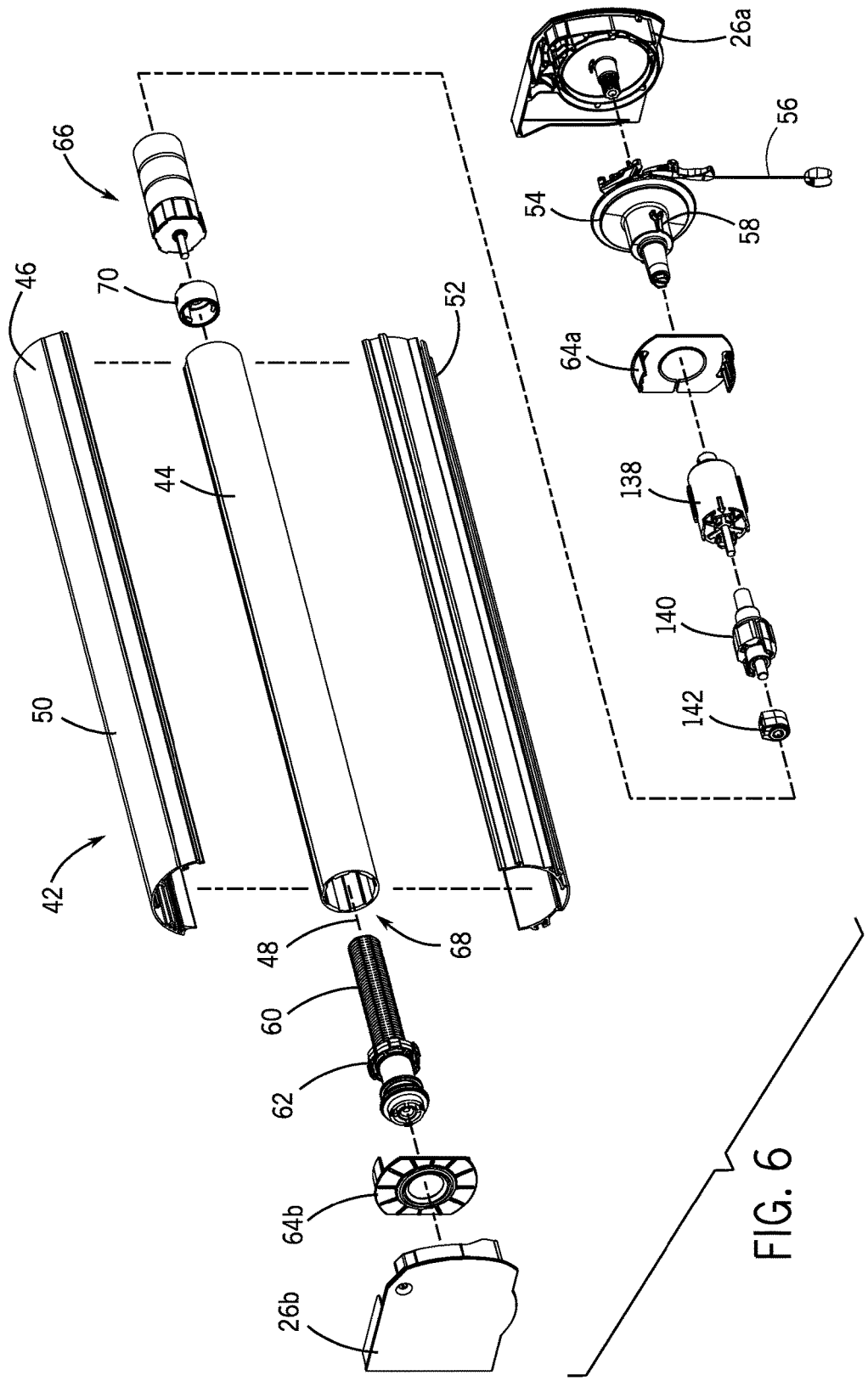
FIG. 6 is an isometric, partially-exploded view of head rail components of the covering of FIG. 1 in accordance with some embodiments of the present disclosure. A head rail cover, the first shade, and the second shade are not shown for clarity.
Figure 7A:
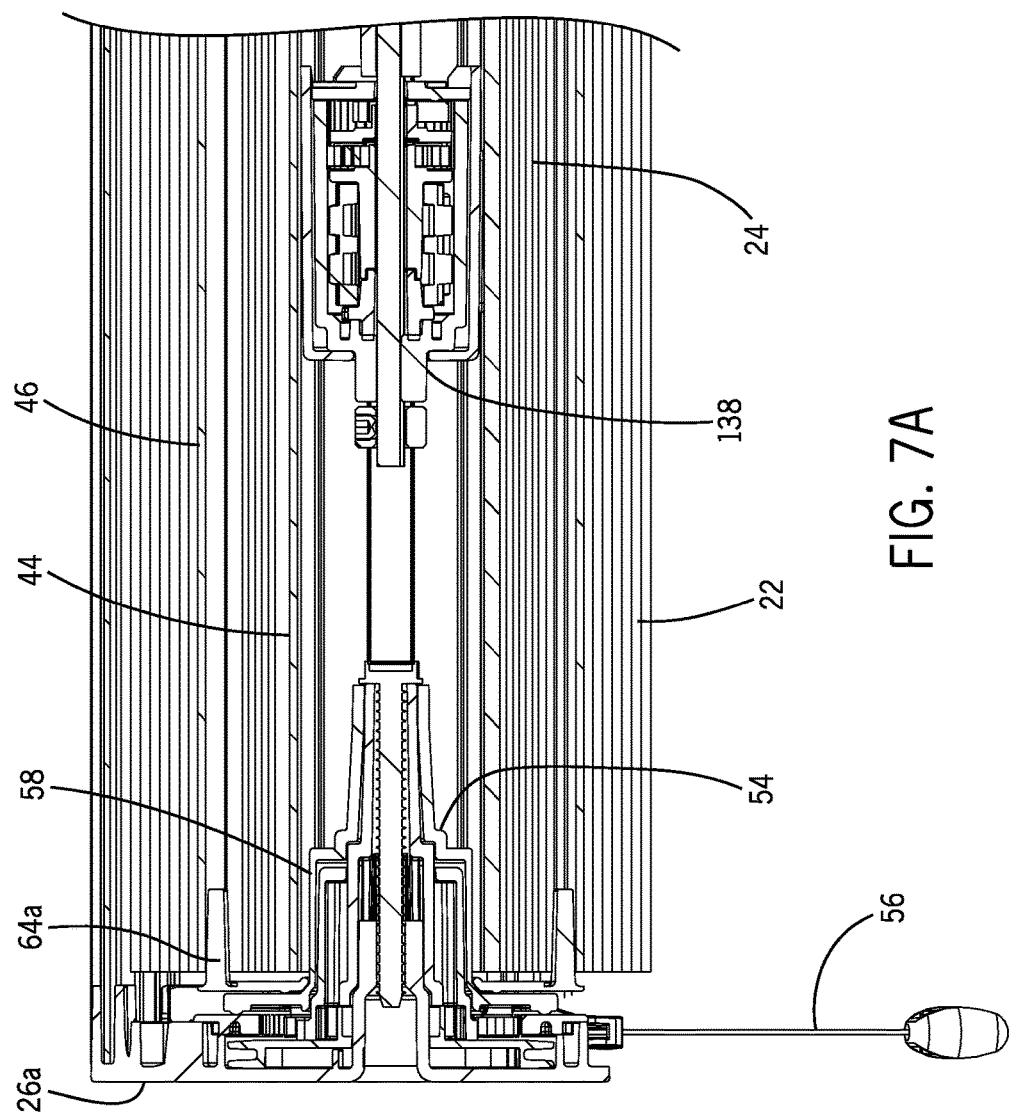
FIG. 7A is a fragmentary lengthwise cross-sectional view of a first end portion of the covering of FIG. 1 taken along line 7-7 of FIG. 1 in accordance with some embodiments of the present disclosure.
Figure 7B:
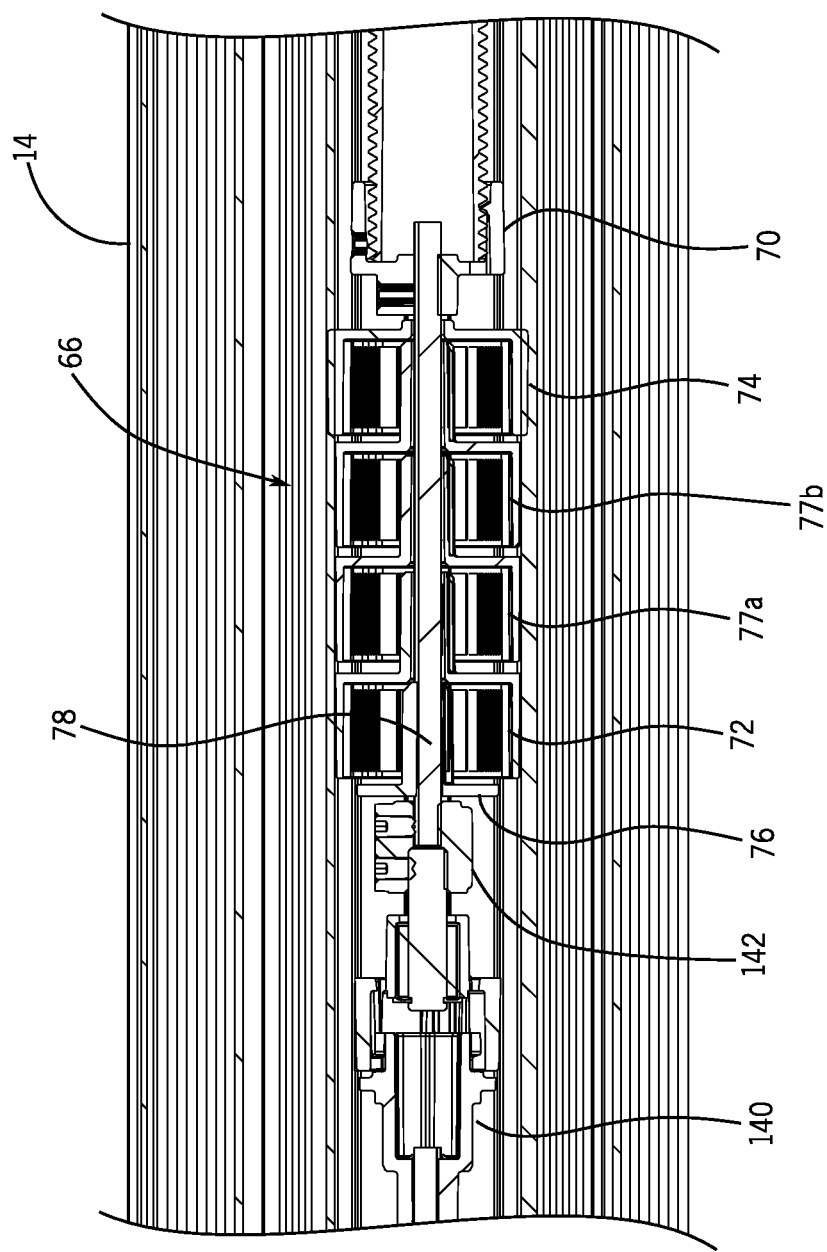
FIG. 7B is a fragmentary lengthwise cross-sectional view of a middle portion of the covering of FIG. 1 taken along line 7-7 of FIG. 1 in accordance with some embodiments of the present disclosure.
Figure 7C:
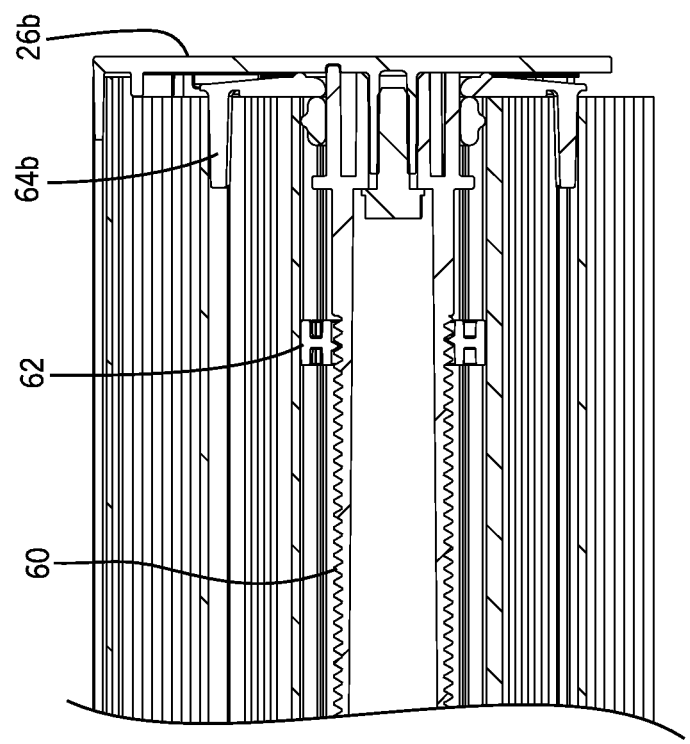
FIG. 7C is a fragmentary lengthwise cross-sectional view of a second end portion of the covering of FIG. 1 taken along line 7-7 of FIG. 1 in accordance with some embodiments of the present disclosure.
Figure 8:
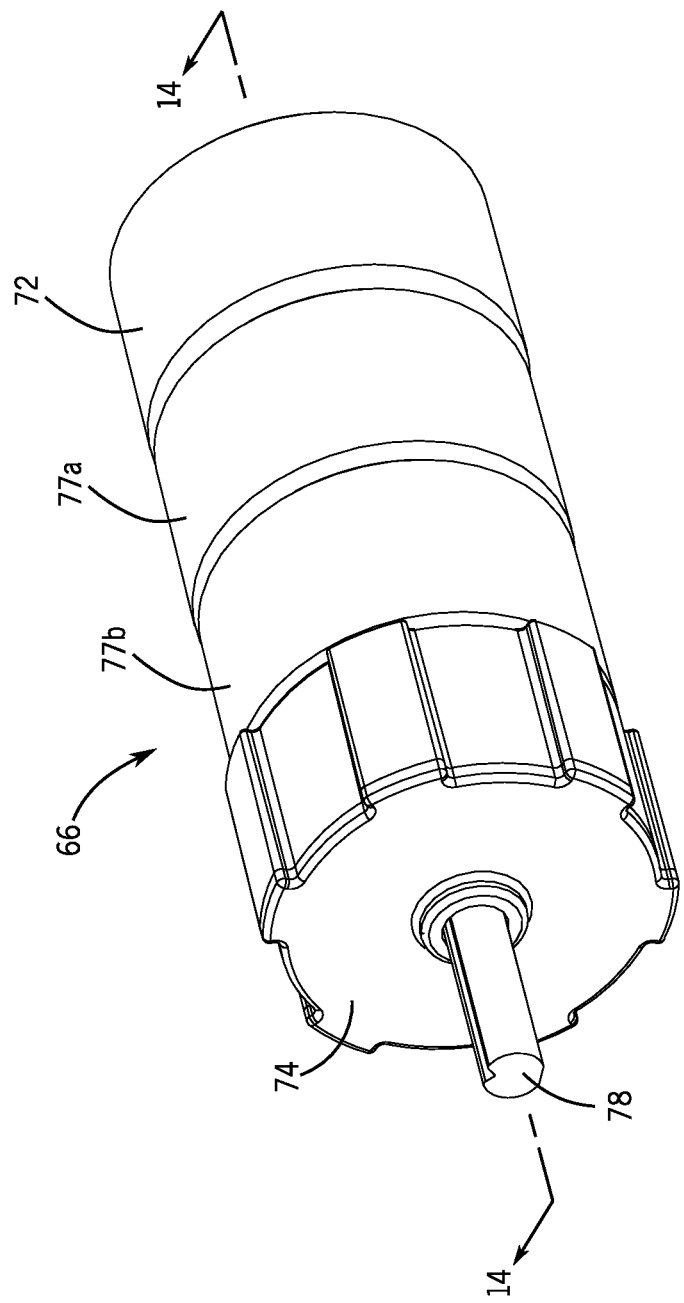
FIG. 8 is an isometric view of a multiple stage spring assembly of the covering of FIG. 1 in accordance with some embodiments of the present disclosure.

Referring to FIGS. 6-7C, the covering 10 may include a dual roller unit 42, which may be disposed within the head rail 14. The dual roller unit 42 may include an inner roller 44 and an outer roller 46. The inner roller 44 may be positioned inside the outer roller 46, and the rollers 44, 46 may be coaxially aligned about the same rotational axis 48.

Referring still to FIGS. 6-7C, the inner roller 44 may be generally cylindrical in shape and may be formed as a tube. The second shade 24 may be attached along an upper edge to an outer surface of the inner roller 44 by adhesive, corresponding grooves and strips of material, or other suitable attachment features. The outer roller 46 may be generally cylindrical in shape and may surround the inner roller 44. The outer roller 46 may be formed of two pieces 50, 52 that interlock with one another. Referring to FIG. 6, the outer roller 46 may include a first shell 50 and a second shell 52 that engage along longitudinal edges. The first and second shells 50, 52 may be elongated and have semi-circular profiles. The first shade 22 may be attached along an upper edge to the outer roller 46 by adhesive, corresponding grooves and strips of material, or other suitable attachment features. Referring to FIG. 7, the inner and outer rollers 44, 46 may extend substantially the entire distance between the right and left end caps 26a, 26b. Referring to FIGS. 6 and 7, the dual roller unit 42 may be rotatably supported by the opposing end caps 26a, 26b.

With continued reference to FIGS. 6-7C, the covering 10 may include a drive or operating mechanism 54 configured to raise or retract the first shade 22, the second shade 24, or both. The operating mechanism 54 may be controlled mechanically and/or electrically. In some embodiments, the operating mechanism 54 may include an operating element 56 (e.g., a ball chain, a cord, or a wand) to allow the user to extend or retract the first shade 22, the second shade 24, or both. To move the shades 22, 24, an operator may manipulate the operating element 56. For example, to raise or retract the shades 22, 24 from an extended position, the operator may pull the operating element 56 in a downward direction. To extend or lower the shades 22, 24 from a retracted position, the operator may manipulate the operating element 56 to release a brake, which may allow the shades 22, 24 to lower under the influence of gravity. The operating mechanism 54 may be attached to either end cap. Referring to FIG. 7A, the operating mechanism 54 may be attached to the right end cap 26a and may be actuated by the operating element 56, for example.

Additionally, or alternatively, the operating mechanism 54 may include an electric motor configured to extend or retract the shades 22, 24 upon receiving an extension or retraction command. The motor may be hard-wired to a switch and/or operably coupled to a receiver that is operable to communicate with a transmitter, such as a remote control unit, to permit a user to control the motor and thus the extension and retraction of the shades 22, 24. The motor may include a gravity lower state to permit the shades 22, 24 to lower via gravity without motor intervention, thereby reducing power consumption.

The operating mechanism 54 may be operably associated with the inner roller 44 to cause the inner roller 44 to rotate. The operating mechanism 54 may include an internal fitting 58, which may be received within the inner roller 44 and may tightly engage the wall of the inner roller 44. The internal fitting 58 may be driven in rotation by the operating mechanism 54, and thus may drive the inner roller 44 in rotation. The operating mechanism 54 may include a planetary gear drive. The operating mechanism 54 may include a brake system operably coupled to the inner roller 44 to restrict unwanted downward movement of the first shade 22, the second shade 24, or both.

Referring to FIGS. 6 and 7C, a limit screw 60 may be positioned inside the inner roller 44 and may be non-rotatably attached to one of the end caps. Referring to FIG. 7C, the limit screw 60 may be fixed to the left end cap 26b such that the limit screw 60 does not rotate relative to the end cap 26b. A limit nut 62 may be threadedly mounted onto the limit screw 60 and may be keyed to the inner roller 44 such that the limit nut 62 rotates in unison with the inner roller 44 relative to the limit screw 60. The key structure may allow axial movement of the limit nut 62 along the length of the inner roller 44. As the inner roller 44 rotates, the limit nut 62 may move along the externally-threaded limit screw 60 and may engage a limit stop formed on the limit screw 60 to define a lowermost extended position of the second shade 24 (see FIG. 5). Additionally, or alternatively, a top limit stop may be disposed on the limit screw 60 to define an uppermost retracted position of the dual roller unit 42.

Referring still to FIGS. 6 and 7C, right and left bushings 64a, 64b may be axially aligned with the inner roller 44 and may be disposed adjacent opposing ends of the inner roller 44. The right bushing 64a may be rotatably mounted onto the operating mechanism 54, and the left bushing 64b may be rotatably mounted onto the limit screw 60. The bushings 64a, 64b may lock into the ends of the outer roller 46 to maintain a desired spatial relationship between the shells 54, 56. When the bushings 64a, 64b are engaged with the opposing ends of the outer roller 46, the bushings 64a, 64b and the outer roller 46 may rotate in unison about the rotation axis 48 of the inner and outer rollers 44, 46.

Referring to FIGS. 6-10, the covering 10 may include a spring assembly 66. The spring assembly 66 may be received within an interior space 68 (see FIG. 6) of the inner roller 44. The spring assembly 66 may be axially aligned with and extend lengthwise along the rotation axis 48 of the inner roller 44. The spring assembly 66 may be non-rotatably attached to a cantilevered end of the limit screw 60 by a connector 70.

With reference to FIGS. 7B and 8-10, the spring assembly 66 may include multiple stages. The spring assembly 66 may include a first stage 72 and a second stage 74, and any number (including zero) of additional or intermediate stages 77 therebetween. In the following description, the term "intermediate" is used for the sake of simplicity without intent to limit. The first stage 72 and the second stage 74 may be disposed alongside one another within the interior space 68 of the inner roller 44. The first stage 72 may be attached to a rotationally-fixed member 76, which may be referred to as an arbor. The second stage 74 may be keyed to the inner roller 44 so that the second stage 74 rotates with the inner roller 44. The second stage 74 may be rotatable relative to the rotationally-fixed member 76. The first stage 72 and the second stage 74 preferably rotate together although they are fixedly coupled at ends opposite each other to different other elements. The intermediate stages 77 are coupled between the first stage 72 and the second stage 74 to rotate along with the rotation of first stage 72 and second stage 74. Use of intermediate stages 77 permits formation of an essentially modular spring assembly which permits ready adjustment of the effective length of the spring without necessarily affecting amplitude of power. This modular nature of the assembly allows for mixing of springs which may allow spring amplitude variation depending on the application. In one embodiment, described in further detail below, the spring system has one fixed arbor, and two or more stages coupled for rotation with respect to the fixed arbor. The first stage is coupled to the fixed arbor, and the arbor of each subsequent stage is essentially an extension of the housing of the prior stage. Thus, the stages may be considered extensions of one another, increasing the overall effective length of the spring of the spring assembly. The first stage 72, the second stage 74, the intermediate stage(s) 77, and the non-rotatable member 76 may be axially aligned with the rotation axis 48 of the inner roller 44. The illustrative embodiments shown in the accompanying drawings show examples of manners in which the stages may be interconnected.

With continued reference to FIGS. 7B and 8-10, and as noted above, the spring assembly 66 may include intermediate stages 77 disposed between the first and second stages 72, 74 along the rotational axis 48 of the inner roller 44. The number of intermediate stages 77 of the spring assembly 66 may depend upon various factors and combinations thereof such as the desired extent of extension of the stage, the effective shade length of an associated covering, and/or the dimension of an associated architectural opening in a travel direction of the shades 22, 24. For example, the spring assembly 66 may include one or more intermediate stages 77 when the spring assembly 66 is implemented in an architectural covering having an effective shade length that exceeds the number of combined spring turns of the first and second stages 72, 74. In FIGS. 7B and 8-10, the spring assembly 66 includes two intermediate stages 77a, 77b positioned axially between the first and second stages 72, 74.

With continued reference to FIGS. 7B and 8-10, the spring assembly 66 may include a stationary shaft 78. The shaft 78 may be axially aligned with and extend lengthwise along the rotation axis 48 of the inner roller 44. The shaft 78 may be non-rotatably coupled to one of the end caps 26. The shaft 78 may be non-rotatably attached to the limit screw 60 by the connector 70. The first stage 72, the second stage 74, and the rotationally-fixed member 76 may be may be mounted onto the stationary shaft 78 and axially aligned with one another along the rotation axis 48 of the inner roller 44. The first stage 72, the second stage 74, and the intermediate stage(s) 77 may be at least partially rotatable relative to the stationary shaft 78. The intermediate stage(s) 77 in the illustrated embodiment may be considered to "float" with respect to the stationary shaft 78 as will be appreciated with reference to the further description provided below.

Figure 13:
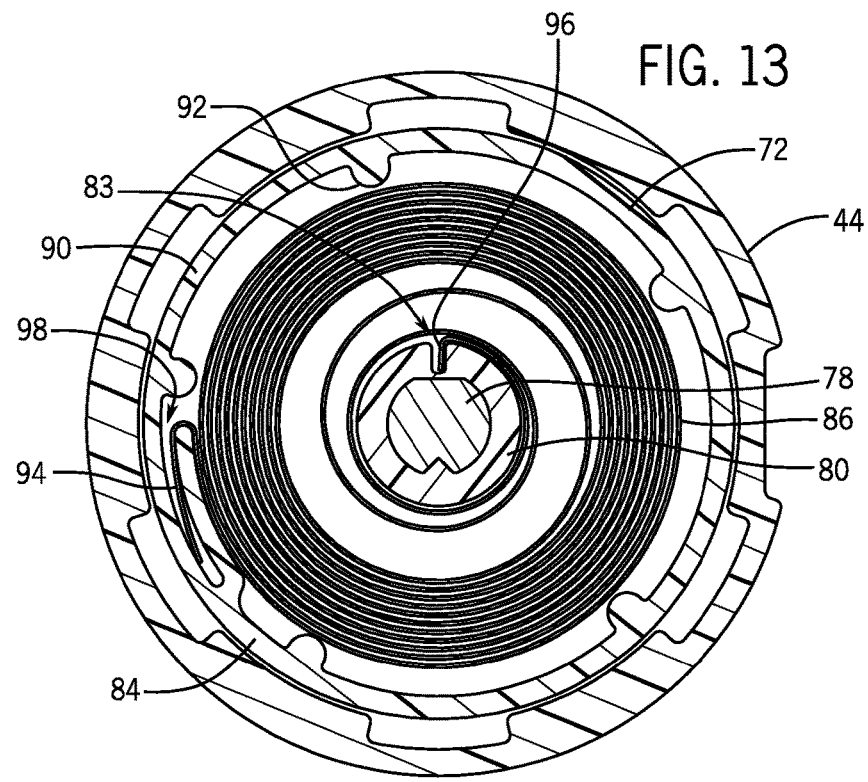
FIG. 13 is a transverse cross-sectional view of another stage of the spring assembly of FIG. 8 taken along line 13-13 of FIG. 11 in accordance with some embodiments of the present disclosure.

Referring to FIGS. 9 and 10, the rotationally-fixed member 76 may be non-rotatably mounted onto the shaft 78. For example, the rotationally-fixed member 76 may be non-rotatably keyed to the stationary shaft 78. The rotationally-fixed member 76 may include an axially-extending sleeve 80 and a flange 82 extending radially outwardly from one end of the sleeve 80. The sleeve 80 may define an internal bore configured to receive the shaft 78. Referring to FIGS. 13 and 16, the sleeve 80 may define an external groove 83 extending lengthwise along the sleeve 80. The groove 83 may be formed in an outer surface of the sleeve 80.

Figure 11:
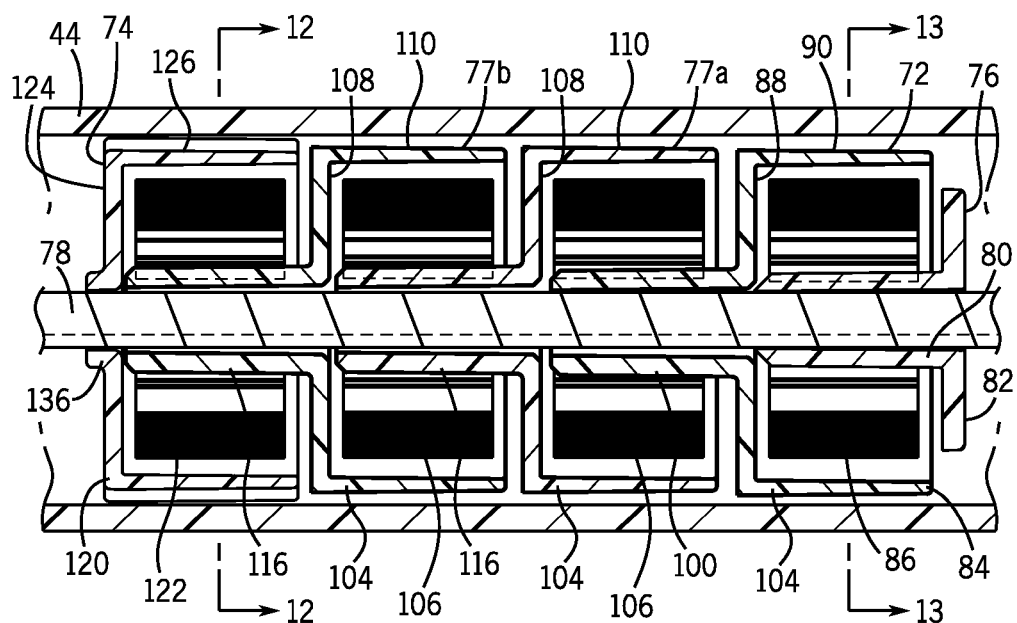
FIG. 11 is a lengthwise cross-sectional view of the spring assembly of FIG. 8 taken along line 14-14 of FIG. 8.

Referring to FIGS. 9-11, the first stage 72 may be attached to the rotationally-fixed member 76. The first stage 72 may be disposed at least partially axially adjacent the flange 82 of the rotationally-fixed member 76 and may surround at least a portion of the sleeve 80 of the rotationally-fixed member 76. The first stage 72 may be attached to the sleeve 80. The first stage 72 may include a housing 84 and a spring 86 received within the housing 84. The housing 84 may surround at least a portion of the sleeve 80 of the rotationally-fixed member 76. The housing 84 may be rotatable relative to the sleeve 80 of the rotationally-fixed member 76. A portion of the housing 84 may be disposed radially between the rotationally-fixed member 76 and the inner roller 44. At least a portion of the spring 86 may be disposed radially between the housing 84 and the sleeve 80. The spring 86 may be attached along opposing end portions to the housing 84 and the sleeve 80.

With continued reference to FIGS. 9-11, the housing 84 may be cup-shaped. The housing 84 may include an end wall 88 and a collar 90. The end wall 88 may be oriented transversely, such as perpendicularly, to the rotation axis 48 of the inner roller 44. The end wall 88 may define an internal bore for receiving the shaft 78. The end wall 88 may rotatably bear against the shaft 78 during operation of the spring assembly 66. The collar 90 may be attached to an outer periphery of the end wall 88. The collar 90 may be disposed radially outwardly of and extend axially along the rotation axis 48 of the inner roller 44. The collar 90 may be disposed radially inwardly of the inner roller 44 so as to not interfere with the wall of the inner roller 44 (see FIG. 13). The collar 90 may define an inner space for receiving the spring 86. The collar 90 may surround at least a portion of the sleeve 80 of the rotationally-fixed member 76. The collar 90 may include a plurality of inwardly-directed projections 92 to set an outer diameter of the spring 86 when the spring 86 is in an expanded or unwound configuration.

With reference to FIGS. 9-11 and 13, the spring 86 of the first stage 72 may be disposed within the housing 84 such that the spring 86 is disposed axially adjacent the end wall 88 and radially inwardly of the collar 90. The spring 86 may be positioned at least partially around the sleeve 80 of the rotationally-fixed member 76. The spring 86 may include an outer end portion or tang 94 and an inner end portion or tang 96. The outer end portion 94 may be attached to the housing 84 so that the outer end portion 94 rotates in unison with the housing 84 about the stationary shaft 78. As shown in FIG. 13, the outer end portion 94 may be received within a cavity 98 formed in an inner surface of the collar 90. The inner end portion 96 may be attached to the sleeve 80 of the rotationally-fixed member 76 so that the inner end portion 96 is rotationally fixed about the rotation axis 48. As shown in FIG. 13, the inner end portion 96 may be received within the external groove 83 of the sleeve 80. As shown in FIGS. 9-11 and 14, the spring 86 may be disposed axially adjacent the flange 82 of the rotationally-fixed member 76 so that the spring 86 is captured between the end wall 88 of the first stage 72 and the flange 82 of the rotationally-fixed member 76.

During rotation of the housing 84 in a first rotational direction (clockwise in FIG. 13), the outer end portion 94 of the spring 86 may rotate in unison with the housing 84 relative to the inner end portion 96 and the sleeve 80 to radially contract or wind the spring 86 about the sleeve 80. During rotation of the housing 84 in a second rotational direction (counterclockwise in FIG. 13), the outer end portion 94 of the spring 86 may rotate in unison with the housing 84 relative to the inner end portion 96 and the sleeve 80 to radially expand or unwind the spring 86 from the sleeve 80. One of the projections 92 may be positioned proximate to the cavity 98 to prevent the outer end portion 94 of the spring 86 from inadvertently dislodging from the cavity 98 during operation of the spring assembly 66. The outer end portion 94 of the spring 86 may abut against the one of the projections 92 during operation of the spring assembly 66.

Figure 14:
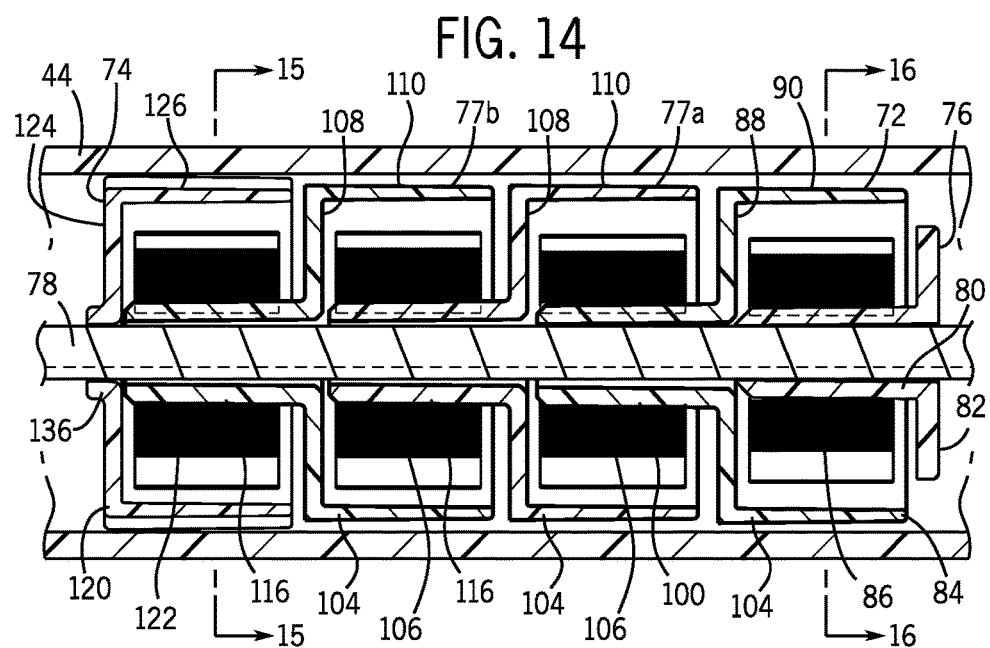
FIG. 14 is a lengthwise cross-sectional view of the spring assembly of FIG. 8 taken along line 14-14 of FIG. 8.

Referring to FIGS. 9, 11, and 14, the first stage 72 may include an axially-extending sleeve 100 extending from the end wall 88 of the housing 84 in an opposite direction relative to the collar 90. The sleeve 100 may define an internal bore configured to receive the shaft 78. The sleeve 100 may rotatably bear against the shaft 78 during operation of the spring assembly 66. The sleeve 100 may function as an arbor for an adjacent stage (e.g., the second stage 74, or an intermediate stage 77). In the illustrate embodiment of FIGS. 9-11, the sleeve 100 may define an external groove 102 for receiving an inner end portion of a spring of an adjacent stage. The groove 102 may extend lengthwise along the sleeve 100 and may be formed in an outer surface of the sleeve 100.

Referring to FIGS. 9-11, the spring assembly 66 may include one or more intermediate stages 77 disposed axially between the first stage 72 and the second stage 74. In FIGS. 9-11, the spring assembly 66 includes two intermediate stages 77a, 77b. It should be understood that the spring assembly 66 may include any number of intermediate stages 77, typically depending upon the effective length of the architectural covering. Generally, the spring assembly 66 may include one or more intermediate stages 77 between the first stage 72 and the second stage 74 for architectural coverings having a shade with an effective length that exceeds the maximum number of turns of the first and second stages 72, 74, which may be limited by the inner diameter of the inner roller 44. In implementations where the first and second stages 72, 74 have sufficient turns to accommodate the effective length of the architectural covering, the spring assembly 66 may include no intermediate stages 77. The intermediate stages 77a, 77b in FIGS. 9-11 are generally substantially identical to one another and thus the features of only one of the intermediate stages 77 is described below for brevity purposes.

Referring to FIGS. 9 and 10, the one or more intermediate stages 77 each may include a housing 104 and a spring 106 received within the housing 104. The housing 104 may be cup-shaped. The housing 104 may be rotatable relative to the inner roller 44. The housing 104 of one stage 77a of the one or more intermediate stages 77 may surround at least a portion of the first stage 72. The housing 104 may include an end wall 108 and a collar 110. The end wall 108 may be oriented transversely, such as perpendicularly, to the rotation axis 48 of the inner roller 44. The end wall 108 may define an internal bore for receiving the shaft 78. The end wall 108 may rotatably bear against the shaft 78 during operation of the spring assembly 66. The collar 110 may be attached to an outer periphery of the end wall 108. The collar 110 may be disposed radially outwardly of and extend axially along the rotation axis 48 of the inner roller 44. The collar 110 may be disposed radially inwardly of the inner roller 44 so as not to interfere with the wall of the inner roller 44 (see FIG. 13). The collar 110 may define an inner space for receiving the spring 106. The collar 110 may surround at least a portion of an adjacent stage, such as the sleeve 100 of the first stage 72. Similar to the collar 90 of the first stage 72, the collar 110 may include a plurality of inwardly-directed projections to set an outer diameter of the spring 106 when the spring 106 is in an expanded or unwound configuration.

With reference to FIGS. 9-11 and 13, the spring 106 may be disposed within the housing 104 such that the spring 106 is located axially adjacent the end wall 108 and radially inwardly of the collar 110. The spring 106 may be positioned at least partially around the sleeve of an adjacent stage, such as the sleeve 100 of the first stage 72. The spring 106 may include an outer end portion or tang 112 and an inner end portion or tang 114. The outer end portion 112 may be attached to the housing 104 so that the outer end portion 112 rotates in unison with the housing 104 about the stationary shaft 78. Similar to the outer end portion 94 of the spring 86 of the first stage 72, the outer end portion 112 may be received within a cavity formed in an inner surface of the collar 110. The inner end portion 114 of the spring 106 may be attached to the sleeve 116 (in the case of an intermediate stage 77) or 100 (in the case of first stage 72) of an adjacent stage so that the inner end portion 114 rotates in unison with the housing of the adjacent stage about the stationary shaft 78. For example, the inner end portion 114 of the spring 106 of the first intermediate stage 77a in FIGS. 9 and 10 may be attached to the sleeve 100 of the first stage 72 so that the inner end portion 114 is rotationally fixed to the sleeve 100 of the housing 84 and rotates in unison with the housing 84 about the stationary shaft 78. The inner end portion 114 of the spring 106 may be received within an external groove of a sleeve of an adjacent stage. For example, the inner end portion 114 of the spring 106 of the first intermediate stage 77a in FIGS. 9 and 10 may be received within the external groove 102 of the rotatable housing 84 of the first stage 72. As shown in FIGS. 9-11 and 14, the spring 106 may be captured axially between end walls of adjacent stages. For example, the spring 106 of the first intermediate stage 77a may be disposed axially between the end wall 88 of the first stage 72 and the end wall 108 of the first intermediate stage 77a.

During rotation of the housing 104 in a first rotational direction (clockwise in FIG. 13), the outer end portion 112 of the spring 106 may rotate in unison with the housing 104 relative to the inner end portion 114 and the sleeve 100 or 116 to radially contract or wind the spring 106 about the sleeve 100 or 116. During rotation of the housing 104 in a second rotational direction (counterclockwise in FIG. 13), the outer end portion 112 of the spring 106 may rotate in unison with the housing 104 relative to the inner end portion 114 and the sleeve 100 or 116 to radially expand or unwind the spring 106 from the sleeve 100 or 116. Similar to the housing 84 of the first stage 72, the housing 104 may include a projection positioned proximate to a cavity formed in the housing 104 to prevent the outer end portion 112 of the spring 106 from inadvertently dislodging from the cavity during operation of the spring assembly 66. The outer end portion 112 of the spring 106 may abut against the one of the projections during operation of the spring assembly 66. It will be appreciated that the housings 104 of the intermediate stages 77 rotate independently to allow the respective springs 106 to rotate to essentially function as extensions of one another.

Referring to FIGS. 9, 11, and 14, the one or more intermediate stages 77 each may include an axially-extending sleeve 116 extending from the end wall 108 of the housing 104 in an opposite direction relative to the collar 110. The sleeve 116 may define an internal bore configured to receive the shaft 78. The sleeve 116 may rotatably bear against the shaft 78 during operation of the spring assembly 66. The sleeve 116 may define an external groove 118 for receiving the inner end portion of a spring of an adjacent stage. The groove 118 may extend lengthwise along the sleeve 116 and may be formed in an outer surface of the sleeve 116. The one or more intermediate stages 77 may be structurally identical or substantially identical to the first stage 72.

Referring to FIGS. 9-11, the second stage 74 of the spring assembly 66 may be disposed along one end of the spring assembly 66 opposite the first stage 72. The second stage 74 may interface with the roller 44 to transfer a rotational force or torque between the roller 44 and the spring assembly 66. The second stage 74 may have a larger outer dimension in a radial or transverse direction than the first stage 72 and the one or more intermediate stages 77. In some implementations, the second stage 74 is the only stage of the spring assembly 66 to interface with the roller 44.

With reference to FIGS. 9 and 10, the second stage 74 may include a housing 120 and a spring 122 received within the housing 120. The housing 120 may be cup-shaped. The housing 120 may be non-rotatably coupled to the inner roller 44 such that the housing 120 rotates in unison with the inner roller 44. The housing 120 may surround at least a portion of an adjacent stage. The housing 120 may include an end wall 124 and a collar 126. The end wall 124 may be oriented transversely, such as perpendicularly, to the rotation axis 48 of the inner roller 44. The end wall 124 may define an internal bore for receiving the shaft 78. The end wall 124 may rotatably bear against the shaft 78 during operation of the spring assembly 66. The collar 126 may be attached to an outer periphery of the end wall 124. The collar 126 may be disposed radially outwardly of and extend axially along the rotation axis 48 of the inner roller 44. The collar 126 may be externally splined for non-rotatable engagement with an inner surface of the inner roller 44 (see FIG. 12). The external splines 127 may be received within internal grooves 128 defined by the roller 44 (see FIG. 12). The collar 126 may define an inner space for receiving the spring 122. The collar 126 may surround at least a portion of an adjacent stage, such as the sleeve 100 of the first stage 72 or the sleeve 116 of an intermediate stage 77. The collar 126 may include a plurality of inwardly-directed projections 129 to set an outer diameter of the spring 122 when the spring 122 is in an expanded or unwound configuration.

Figure 12:
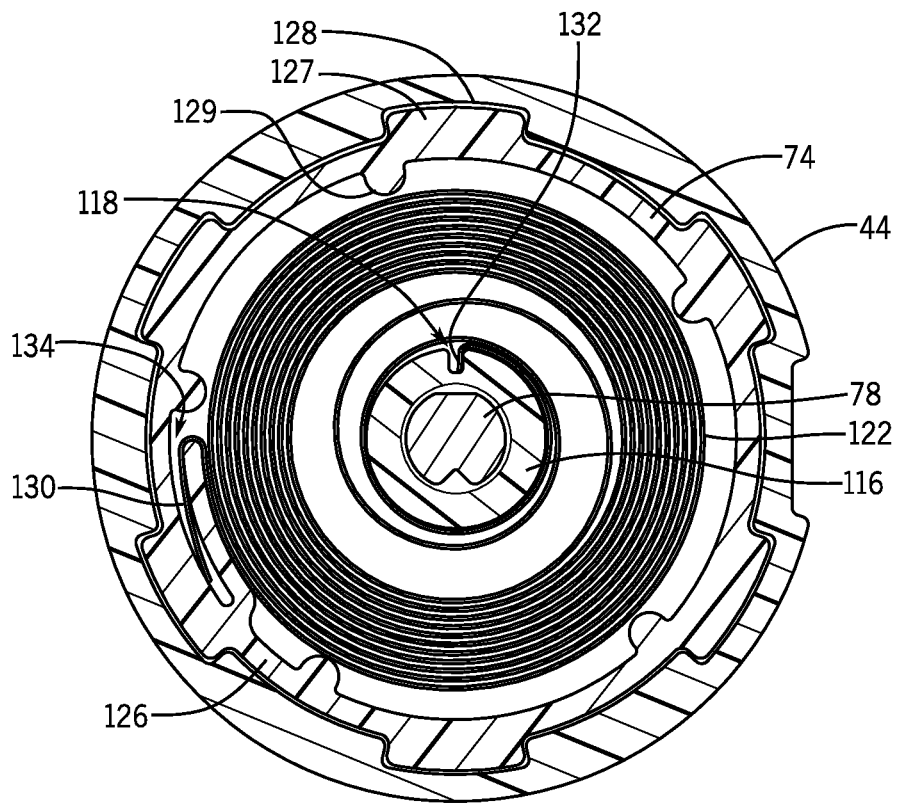
FIG. 12 is a transverse cross-sectional view of a stage of the spring assembly of FIG. 8 taken along line 12-12 of FIG. 11 in accordance with some embodiments of the present disclosure.

With reference to FIGS. 10-12, the spring 122 of the second stage 74 may be disposed at least partially within the housing 120. In some implementations, the spring 122 is disposed axially adjacent the end wall 124 and radially inwardly of the collar 126. The spring 122 may be positioned at least partially around the sleeve of an adjacent stage, such as the sleeve 100 of the first stage 72 or the sleeve 116 of an intermediate stage 77. The spring 122 may include an outer end portion or tang 130 and an inner end portion or tang 132. The outer end portion 130 may be attached to the housing 120 so that the outer end portion 130 rotates in unison with the housing 120 about the stationary shaft 78. The outer end portion 130 may be received within a cavity 134 formed in an inner surface of the collar 126.

The inner end portion 132 may be attached to the sleeve 100 or 116 of an adjacent stage so that the inner end portion 132 rotates in unison with the housing of the adjacent stage about the stationary shaft 78. For example, the inner end portion 132 of the spring 122 of the second stage 74 in FIGS. 9-12 may be attached to the sleeve 116 of the housing 104 of the intermediate stage 77b so that the inner end portion 132 rotates in unison with the housing 104 about the stationary shaft 78. In implementations not having an intermediate stage 77, the inner end portion 132 of the spring 122 of the second stage 74 may be attached to the sleeve 100 of the first stage 72 so that the inner end portion 132 rotates in unison with the housing 84 of the first stage 74 about the stationary shaft 78.

The inner end portion 132 of the spring 122 may be received within an external groove of a sleeve of an adjacent stage. For example, the inner end portion 132 in FIGS. 9 and 10 may be received within the external groove 118 of the rotatable housing 104 of the intermediate stage 77b. In implementations not having an intermediate stage 77, the inner end portion 132 may be received within the external groove 102 of the first stage 72. As shown in FIGS. 9-11 and 14, the spring 122 may be captured axially between end walls of adjacent stages. For example, as shown in FIGS. 9-11 and 14, the spring 122 may be disposed axially between the end wall 108 of an intermediate stage 77b and the end wall 124 of the second stage 74. In implementations not having an intermediate stage 77, the spring 122 may be disposed axially between the end wall 88 of the first stage 72 and the end wall 124 of the second stage 74 so that the spring 122 is captured between the first and second stages 72, 74.

During rotation of the housing 120 in a first rotational direction (clockwise in FIG. 12), the outer end portion 130 of the spring 122 may rotate in unison with the housing 120 to radially contract or wind the spring 122 about the sleeve 116 of an intermediate stage 77 or the sleeve 100 of the first stage 72 depending upon whether the spring assembly 66 includes one or more intermediate stages 77. During rotation of the housing 120 in a second rotational direction (counterclockwise in FIG. 12), the outer end portion 130 of the spring 122 may rotate in unison with the housing 120 relative to the inner end portion 132 and the sleeve 100 or 116 to radially expand or unwind the spring 122 from the sleeve depending upon whether the spring assembly 66 includes one or more intermediate stages 77. One of the inwardly-directed projections 129 in the collar 126 may be positioned proximate to the cavity 134 to prevent the outer end portion 130 of the spring 122 from inadvertently dislodging from the cavity 134 during operation of the spring assembly 66. The outer end portion 130 of the spring 122 may abut against one of the projections 129 to radially expand or unwind the spring 122 during operation of the spring assembly 66.

Referring to FIGS. 9, 11, and 14, the second stage 74 may include an axially-extending sleeve 136 extending from the end wall 124 of the housing 120 in an opposite direction relative to the collar 126. The sleeve 136 may define an internal bore configured to receive the shaft 78. The sleeve 136 may rotatably bear against the shaft 78 during operation of the spring assembly 66. The sleeve 136 may have a shorter length that the sleeve 80 of the first stage 72, the sleeve 116 of the one or more intermediate stages 77, or both.

Referring to FIGS. 11 and 14, the first stage 72, the second stage 74, and the one or more intermediate stages 77 may be axially aligned with one another when the spring assembly 66 is assembled. The one or more intermediate stages 77 may be disposed axially between the first and second stages 72, 74. The springs 86, 106, 122 of the stages 72, 74, 77 may be identical or substantially identical to one another. The springs 86, 106, 122 may be torsion springs, for example spiral-wound torsion springs, and may be referred to as clock springs. As will be appreciated, the number of intermediate stages 77 may be varied as desired to result in the desired number of spring turns provided by the stages present in the spring assembly 66.

Referring to FIGS. 6-7C, the covering 10 may include a speed governing device 138 to control or regulate the descent of the first shade 22, the second shade 24, or both. The speed governing device 138 may be disposed within the interior space 68 of the inner roller 44 and may engage the wall of the inner roller 44. The speed governing device 138 may be disposed axially between the spring assembly 66 and the operating mechanism 54.

The speed governing device 138 may be operably coupled to the spring assembly 66 by a clutch mechanism 140, such as a one-way roller bearing. The clutch mechanism 140 may deactivate or disengage the speed governing device 138 from the spring assembly 66 when the inner roller 44 is rotating in a retraction direction to retract the first shade 22, the second shade 24, or both. The clutch mechanism 140 may be disposed within the interior space 68 of the inner roller 44 axially between the spring assembly 66 and the speed governing device 138. The clutch mechanism 140 may be removably attached to a cantilevered end of the spring assembly 66 by a connector 142. The connector 142 may be mounted onto an end portion of the stationary shaft 78.

Referring to FIGS. 1-7C, the first shade 22 may be coupled to and wrappable about the outer roller 46. An upper edge of each of the front and rear sheets 30, 34 may be attached to the outer roller 46. Generally, rotation of the outer roller 46 in a first direction retracts the first shade 22 by winding the first shade 22 about the outer roller 46, and rotation of the outer roller 46 in a second, opposite direction extends the first shade 22 across the opening by unwinding the first shade 22 from the outer roller 46.

Referring still to FIGS. 1-7C, the second shade 24 may be coupled to and wrappable about the inner roller 44. An upper edge of second shade 24 may be attached to the inner roller 44. Generally, rotation of the inner roller 44 in a first direction retracts the second shade 24 by winding the second shade 24 about the inner roller 44, and rotation of the inner roller 44 in a second, opposite direction extends the second shade 24 across the opening by unwinding the second shade 24 from the inner roller 44.

Referring to FIGS. 1 and 7A-7C, the first and second shades 22, 24 are in fully-retracted positions and concealed within the head rail 14. In this configuration (see FIGS. 7A-7C), the second shade 24 is fully wrapped about the inner roller 44 and the first shade 22 is fully wrapped about the outer roller 46. In some embodiments, the first bottom rail 18 engages a portion of the head rail 14 to define a top limit stop of the covering 10. When the first and second shades 22, 24 are in the fully-retracted positions, the spring assembly 66 may be in a contracted or wound configuration (see FIG. 14). In the contracted or wound configuration, the spring assembly 66 may store sufficient potential energy to assist a full deployment of the first shade 22, the second shade 24, or both so that the effective length of the first shade 22 (see FIG. 3), the second shade 24 (see FIG. 5), or both is extended across the architectural opening. In this configuration, the springs 86, 106, 122 of the spring assembly 66 may be wound about the sleeves 80, 100, 116 of the multiple stages 72, 77.

To extend the first shade 22 from the head rail 14, the user may actuate the operating mechanism 54 to cause the inner roller 44 to rotate in an extension direction, which in turn may cause the outer roller 46 to rotate in an extension direction due at least in part to the weight of the first bottom rail 18 applying a downward force to the first shade 22. As the first shade 22 extends from the outer roller 46, the outer roller 46 generally rotates in unison with the inner roller 44.

Referring to FIG. 2, the first shade 22 is extended from the outer roller 46 in a closed or collapsed configuration in which the front and rear sheets 30, 34 are relatively close together and the vanes 38 extend vertically in an approximately coplanar, contiguous relationship with the front and rear sheets 30, 34. Once the first shade 22 is substantially unwrapped from the outer roller 46, continued rotation of the outer roller 46 in the extension direction moves the front and rear sheets 30, 34 in generally opposite vertical directions relative to each other to shift the vanes 38 from a closed position (FIG. 2) to an open position (FIG. 3). A rear portion of the first bottom rail 18 may be weighted more than a front portion of the bottom rail 18 to facilitate the opening of the vanes 38. During extension of the first shade 22, the spring assembly 66 may apply a rotational force to the inner roller 44 to assist the deployment of the first shade 22. The second stage 74 may engage the inner roller 44 to rotationally drive the inner roller 44 in the extension direction. The first stage 72, the one or more intermediate stages 77, or both may contribute to the rotational force of the spring assembly 66 and may provide the spring assembly 66 with sufficient turns to ensure the spring assembly 66 assists rotation of the inner roller 44 during the full extension of the first shade 22.

Referring to FIG. 3, the covering 10 is shown with the first shade 24 in a fully extended position with the vanes 38 in an open or expanded configuration. In this position, the front and rear sheets 30, 34 are horizontally spaced apart from one another with the vanes 38 extending substantially horizontally therebetween. Rotation of the outer roller 46 in either direction from that shown in FIG. 3 causes the front and rear sheets 30, 34 to move toward one another and the vanes 38 to re-orient into more vertical alignment.

In order to extend the second shade 24, the operating mechanism 54 may be actuated by the user to rotate the inner roller 44 in the extension direction. During extension of the second shade 24 (see FIG. 4), the outer roller 46 and the first shade 22 may remain stationary due to the weight of the first shade 22 and the weight of the first bottom rail 18 maintaining the rotational position of the outer roller 46. In some embodiments, a lock feature may be used to prevent rotation of the outer roller 46 upon full extension of the first shade 22.

During extension of the second shade 24, the inner roller 44 rotates relative to the outer roller 46, with the fitting 58 and the limit nut 62 supporting the respective ends of the inner roller 44. As the inner roller 44 rotates in the extension direction, the second shade 24 is unwound from the inner roller 44 as it is extended through a longitudinally-extending slot formed in the outer roller 46. The rotation of the inner roller 44 in the extension direction moves the limit nut 62 along the limit screw 60 towards a bottom limit stop. During extension of the second shade 24, the spring assembly 66 may apply a rotational force to the inner roller 44 to assist the deployment of the second shade 24. The second stage 74 may engage the inner roller 44 to rotationally drive the inner roller 44 in the extension direction. The first stage 72, the second stage 74, the one or more intermediate stages 77, or any combination thereof may contribute to the rotational force of the spring assembly 66 and may provide the spring assembly 66 with sufficient turns to ensure the spring assembly 66 assists the inner roller 44 during the full extension of the second shade 24.

Figure 5:
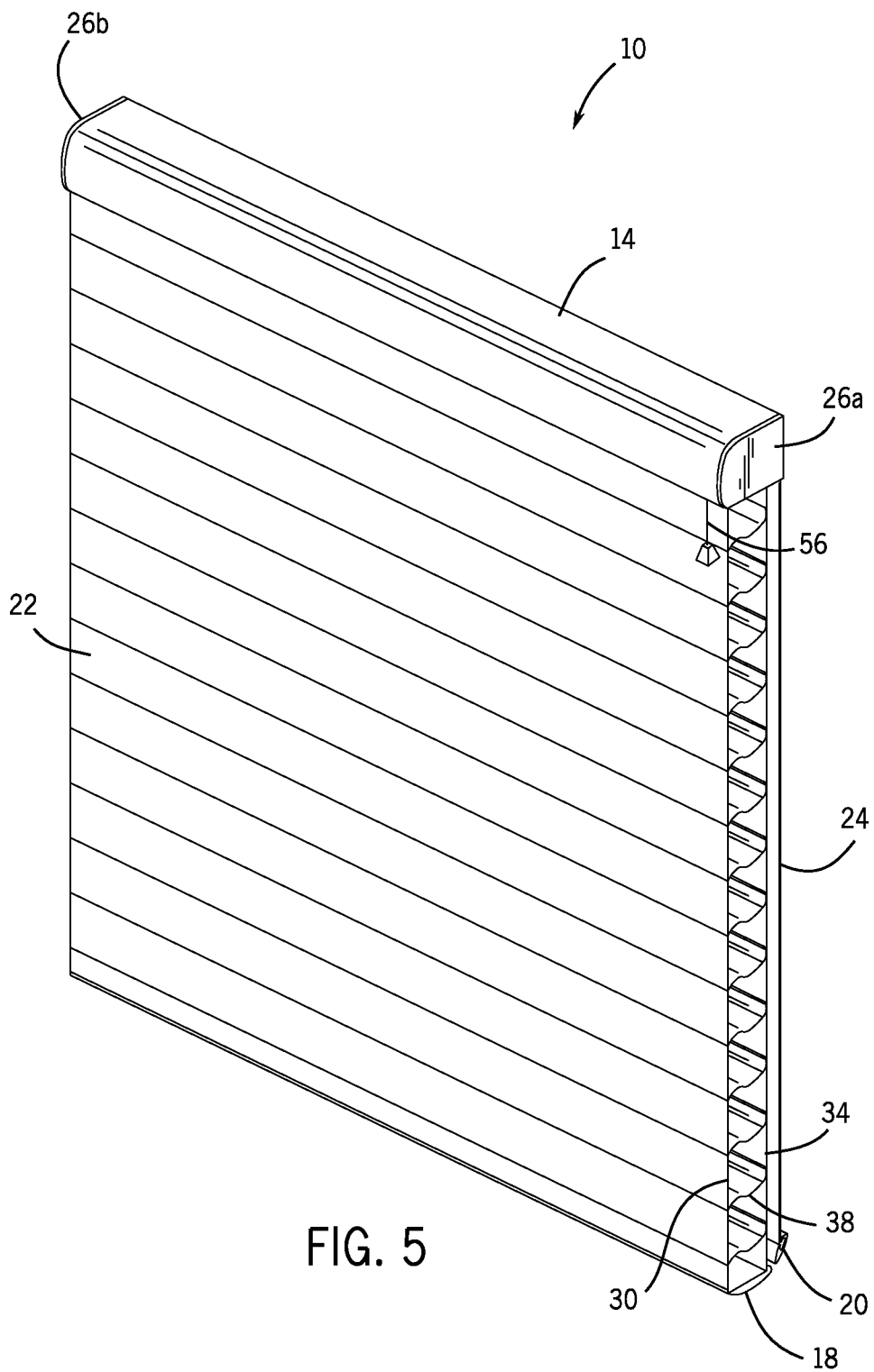
FIG. 5 is an isometric view of the covering of FIG. 1 with first and second shades in fully-extended positions in accordance with some embodiments of the present disclosure.

Referring to FIG. 5, the covering 10 is shown with the first and second shades 22, 24 both in fully-extended positions with the vanes 38 in an open or expanded configuration. In this position, the front and rear sheets 30, 34 are horizontally spaced apart from one another with the vanes 38 extending substantially horizontally therebetween. When the first and second shades 22, 24 are in the fully-extended positions, the spring assembly 66 may be in an expanded or unwound configuration (see FIG. 11). In the expanded or unwound configuration, the springs 86, 106, 122 of the spring assembly 66 may be in an unwound configuration relative to the sleeves 80, 100, 116 of the multiple stages 72, 77. The second shade 24 may be a blackout shade and inhibit light from passing through the second shade 24, and thus through the first shade 22. When the second shade 24 is fully extended (see FIG. 5), the second shade 24 may be offset rearwardly from the first shade 22, but may extend coextensively in length and width with the first shade 22. To control the amount of light passing through the first shade 22, the second shade 24 may be withdrawn into the head rail 14 and wrapped about the inner roller 44 of the dual roller unit 46.

At any point during the extension process, the user may stop the operating mechanism 54 or reverse the direction of the operating mechanism 54 to move the first and second shades 22, 24 into a desired position. In embodiments including a motorized covering, pre-programmed commands may be used to control the motor and thus control the position of the first and second shades 22, 24. The commands may instruct the motor to move the first and second shades 22, 24 into predetermined shade positions, such as a first position in which the first and second shades 22, 24 are fully retracted, a second position in which the first shade 22 is fully extended and the second shade 24 is fully retracted, and a third position in which the first and second shades 22, 24 are fully extended. The commands may be transmitted to the motor by a remote control unit. The spring assembly 66 may assist the motor, gravity, or both during extension of the first and second shades 22, 24.

Retraction of the first and second shades 22, 24 may be accomplished in reverse order as compared to the extension sequence described above, such as generally following FIG. 5 to FIG. 1. In FIG. 5, the first and second shades 22, 24 are disposed in fully extended positions. When both the first and second shades 22, 24 are in the fully extended position, the limit nut 62 may be engaged with a lower limit stop, which may be formed on the limit screw 60. Actuation of the operating mechanism 54, such as by the operating element 42 and/or a motor, from this position moves the limit nut 62 axially away from the lower limit stop and begins the retraction process of the covering 10. The retraction process generally involves actuation of the operating mechanism 54 to first rotate the inner roller 44 in a retraction direction to retract the second shade 24, and when the second shade 24 is fully retracted, the outer roller 46 is then rotated in a retraction direction to retract the first shade 22 onto the outer roller 46. This sequence is described further below.

To retract the second shade 24 from the fully extended position of FIG. 5, the user actuates the operating mechanism 54 to cause the inner roller 44 to rotate in a retraction direction, which in turn wraps the second shade 24 about the inner roller 44 and raises the second bottom rail 20 upwardly along a rear face of the rear sheet 34 of the first shade 22. During retraction of the second shade 24, the inner roller 44 rotates relative to the outer roller 46, with the fitting 64 and the limit nut 62 supporting the respective ends of the inner roller 44. As the inner roller 44 rotates in the retraction direction, the second shade 24 is wound onto the inner roller 44 as it is pulled through the lengthwise slot formed in the outer roller 46. The rotation of the inner roller 44 in the retraction direction moves the limit nut 62 along the limit screw 60 towards the opposite end of the limit screw 60. During the retraction of the second shade 24, the first shade 22 may remain in the fully extended, open position due to the weight of the first bottom rail 18 and the weight of the portion of the first shade 22 suspended from the outer roller 46 acting upon the outer roller 46 to inhibit rotation of the outer roller 46. This may allow the user to move the second shade 24 between fully extended and fully retracted positions without affecting the position or orientation of the first shade 22.

During retraction of the second shade 24, the inner roller 44 may apply a rotational force to the spring assembly 66 and restore the potential energy of the spring assembly 66 by winding the spring assembly 66 in the retraction direction. The inner roller 44 may engage the second stage 74 to rotationally drive the housing 120 of the second stage 74 in the retraction direction. The outer end portion 130 of the spring 122 of the second stage 122 may rotate in unison with the housing 120 of the second stage 74 to begin winding the spring 122 about the sleeve of an adjacent stage, such as the sleeve 116 of the second intermediate stage 77b. As the second intermediate stage 77b is rotated about the stationary shaft 78, the spring 122 may transfer the rotational force of the inner roller 44 to the second intermediate stage 77b, which in turn may transfer the rotational force to the first intermediate stage 77a. As the first intermediate stage 77a is rotated about the stationary shaft 78, the spring 106 of the first intermediate stage 77a may transfer the rotational force of the inner roller 44 to the housing 84 of the first stage 72. Rotation of the housing 84 may cause the spring 86 of the first stage 72 to wind about the sleeve 80 of the rotationally-fixed member 76 as the outer end portion 94 of the spring 86 may rotate in unison with the housing 84 and the inner end portion 96 of the spring 86 may be non-rotatably attached to the rotationally-fixed member 76. Continued retraction of the second shade 24 may cause simultaneous or substantially simultaneous winding of the multiple stages 72, 74, 77 of the spring assembly 66.

Figure 4:
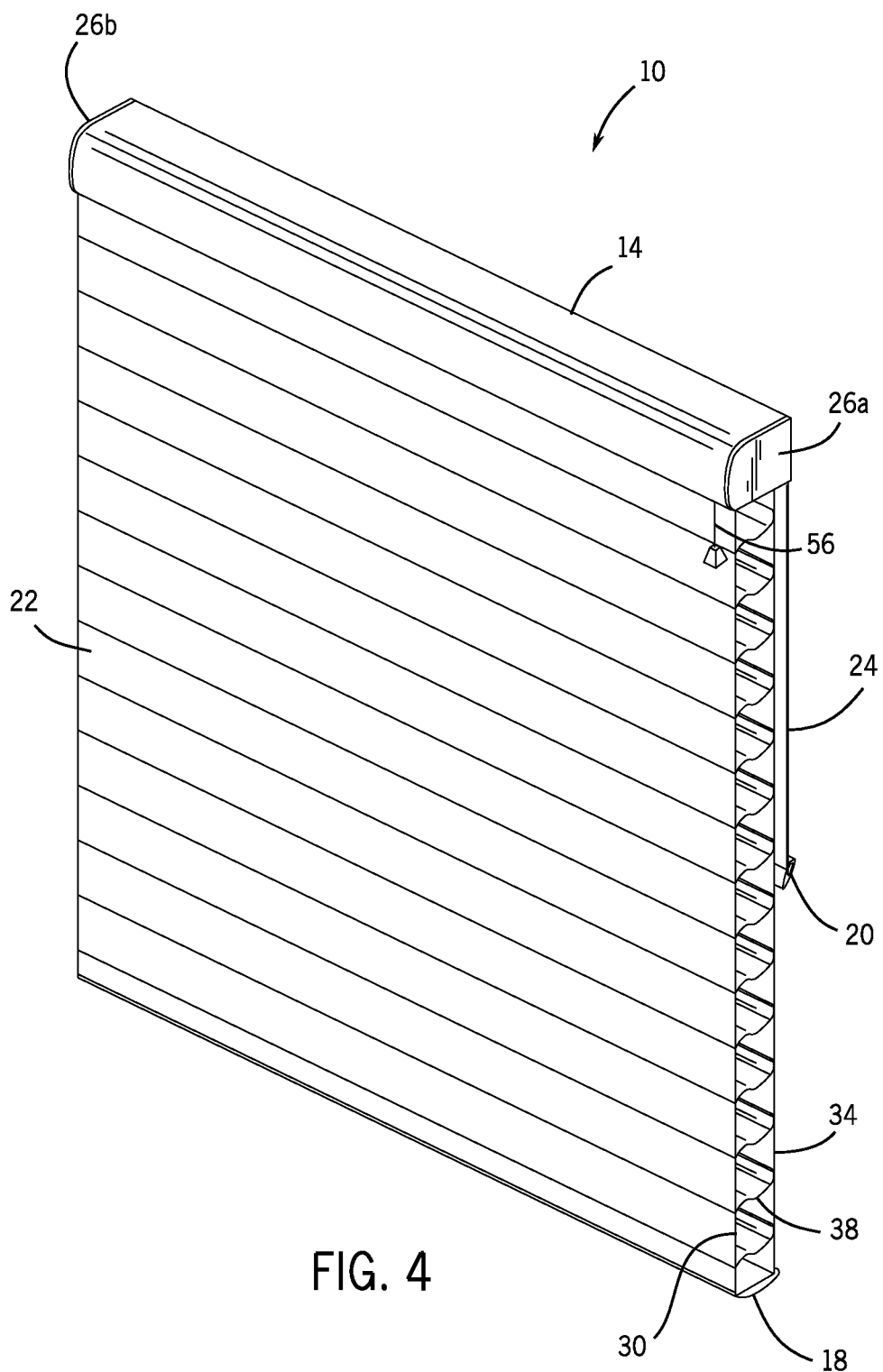
FIG. 4 is an isometric view of the covering of FIG. 1 with a first shade in a fully-extended position and a second shade in a partially-extended position in accordance with some embodiments of the present disclosure.

Referring to FIGS. 3 and 4 in reverse order, as the second shade 24 is further withdrawn into the outer roller 46, the second bottom rail 20 may become securely positioned in a seat formed in a periphery of the outer roller 46. Upon the bottom rail 20 engaging the seat of the outer roller 46, the driving force of the operating mechanism 54 may be transferred through the second shade 24 to the outer roller 46. That is, the operating mechanism 54 may apply a rotational force to the inner roller 44, which in turn may be applied to the outer roller 46 through the engagement of the bottom rail 20 in the seat under the tension of the second shade 24. When the second shade 24 is fully wrapped onto the inner roller 44 and the second bottom rail 20 is received in the seat of the outer roller 46, the outer roller 46 may be driven in a retraction direction by the operating mechanism 54, through rotation of the inner roller 44 in the same retraction direction. As such, when the bottom rail 20 is received in the seat and a retraction force is applied to the inner roller 44 by the operating mechanism 54, the outer roller 46 may rotate in conjunction with the inner roller 44.

Referring to FIG. 2, as the outer roller 46 continues to rotate in the retraction direction, the first shade 22 may be wrapped around the outer roller 46. During retraction of the first shade 22, the inner roller 44 may apply a rotational force to the spring assembly 66 and restore the potential energy of the spring assembly 66 by winding the multiple stages 72, 74, 77 of the spring assembly 66. When the first shade 22 is fully retracted, the first bottom rail 18 may engage a portion of the head rail 14, such as an abutment, to serve as a top limit stop for the dual roller unit 42. It is contemplated that other mechanisms may be utilized to define the top retraction position, including a top limit stop positioned on the limit screw 60 opposite the bottom limit stop. For example, a top limit stop may be formed on the limit screw 60 and positioned along the screw 60 such that the nut 62 engages the top limit stop upon full retraction of the first shade 22. When the covering 10 is in the fully retracted position (see FIG. 1), the spring assembly 66 may be in a radially contracted or wound configuration (see FIG. 14). In the contracted or wound configuration, the spring assembly 66 may store sufficient potential energy to assist a full deployment of the first shade 22, the second shade 24, or both.

Referring generally to FIGS. 1-16, the spring assembly 66 may provide the ability to increase the number of spring-powered turns without increasing the radial or transverse dimension of the spring assembly 66. The spring assembly 66 may be received at least partially within the interior space of a roller (e.g., inner roller 44). The spring assembly 66 may include a non-rotatable first member (e.g., arbor 76), a second member (e.g., housing 84), and a third member (e.g., housing 120). The housing 120 may be coupled to the inner roller 44 such that the housing 120 rotates in unison with the roller 44. The housing 84 may be positioned at least partially between the housing 120 and the arbor 76. The spring assembly 66 may include a first spring 86 including a first end portion 96 coupled to the arbor 76 and a second end portion 94 coupled to the housing 84. The spring assembly 66 may include a second spring 122 including a first end portion 130 coupled to the housing 120 and a second end portion 132 coupled to the housing 84 or 104. In some embodiments, the spring assembly 66 includes intermediate stages 77 to increase the number of spring-powered turns without changing the size of the arbor 76, the housings 84, 120, or the springs 86, 122.

Rotation of the inner roller 44 may cause the housing 120 to rotate in unison with the roller 44. Rotation of the housing 120 may cause the second spring 122 to radially constrict or expand depending on the rotation direction of the housing 120. The spring 122 may cause the housing 84 to rotate in same direction as first housing 120, which in turn may cause the first spring 86 to radially constrict or expand depending on the rotation direction of the housing 84. The arbor 76 may be rotationally fixed, and thus rotation of the housings 84, 120 may wind or unwind the springs 86, 122.

EXAMPLE

Figure 17:
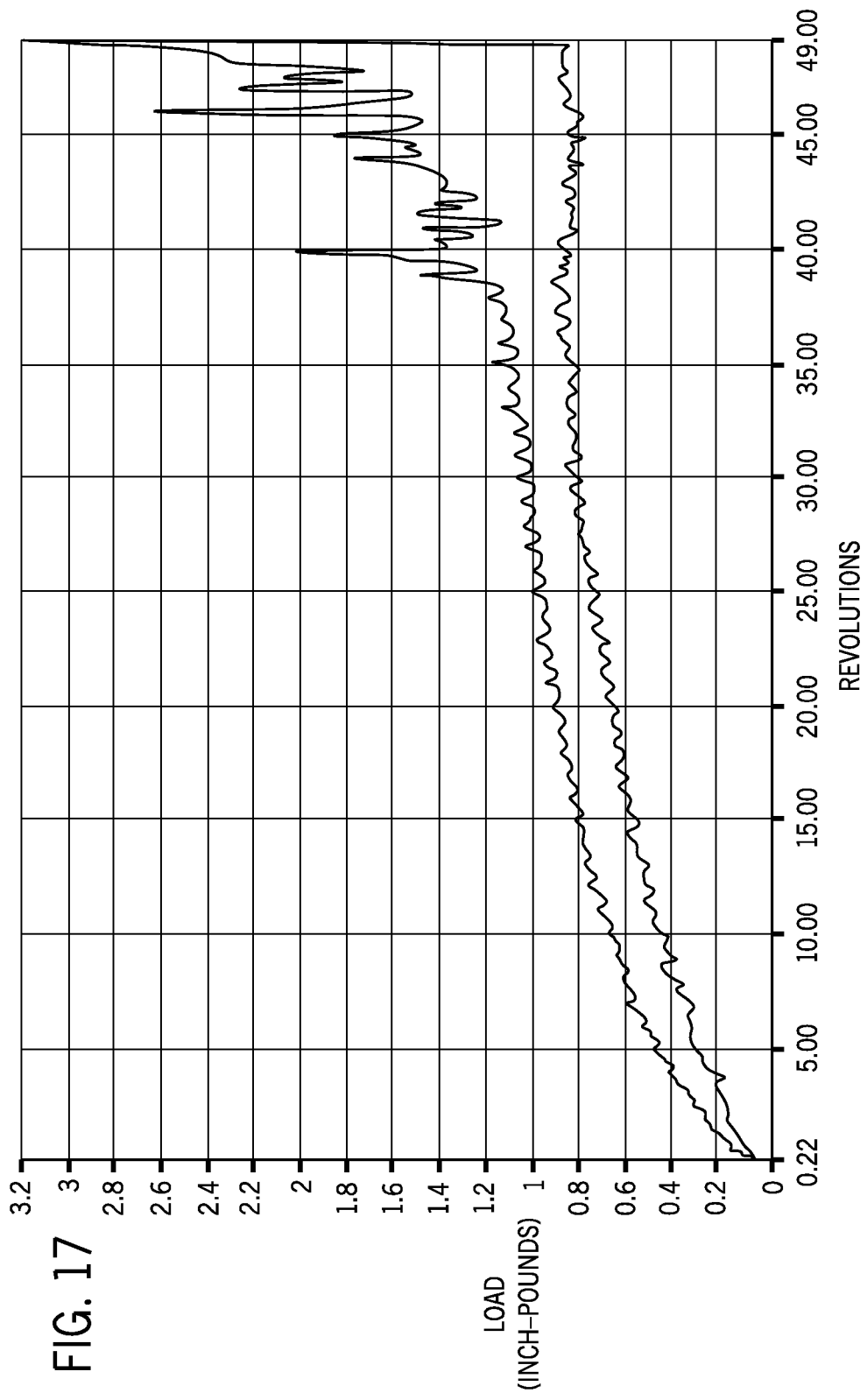
FIG. 17 is a graph of the relationship between a torque of an example spring assembly and a number of revolutions of a roller associated with the spring assembly in accordance with some embodiments of the present disclosure.

An example spring assembly was constructed and performance tested. The example spring assembly was substantially identical to the spring assembly 66. Referring to FIG. 17, a graph of the relationship between a torque of the example spring assembly and a rotational position of an associated roller tube (e.g., roller 44) is provided. As shown in FIG. 17, the load or output torque of the example spring assembly is represented on the y-axis in inch-pounds and the rotational position of the roller tube associated with the example spring assembly is represented on the x-axis in the number of revolutions of the roller tube. The load or output torque of the example spring assembly had a range of between about 0 inch-pounds and about 3.2 inch-pounds. It should be understood this range may be altered by changing the material, the width, the thickness, the number of windings, or other characteristics of the springs of the spring assembly. The number of revolutions of the roller tube associated with the example spring assembly had a range of between about 0.22 revolutions and about 49 revolutions. It should be understood this range may be altered by increasing or decreasing the number of stages in the spring assembly. Generally, adding stages to the spring assembly increases the number of spring-assisted revolutions or turns of the roller tube and thus the travel range of the associated shade, whereas removing stages from the spring assembly decreases the number of spring-assisted revolutions or turns of the roller tube and thus the travel range of the associated shade. Adding or removing stages may increase or decrease, respectively, the overall length of the spring assembly but does not impact the maximum radial or transverse envelope of the spring assembly. The spring assembly may be used in smaller diameter rollers for architectural openings with a large travel-direction dimension by adding stages to increase the number of turns of the spring assembly to assist the extension of the shade across the entire travel-direction dimension of the architectural opening.

Referring still to FIG. 17, in the bottom-left corner of the graph, the example spring assembly was in a fully-extended or unwound position. In the upper-right corner of the graph, the example spring assembly was in a fully-retracted or wound position. The upper line represents the torque applied to the example spring assembly by the roller tube during winding of the spring assembly (e.g., during retraction of the shade). The lower line represents the torque applied by the example spring assembly to the roller tube during unwinding of the spring assembly (e.g., during extension of the shade).

With continued reference to FIG. 17, the increase in torque of the example spring assembly depicted from the bottom-left corner to the upper-right corner of the upper line of the graph represents the load of the example spring assembly during retraction of an associated shade, such as the first and/or second shades 22, 24, from a fully-unwound position of the example spring assembly to a fully-wound position of the spring assembly. During retraction of the associated shade, the roller tube wound the example spring assembly and increased the load of the spring assembly. In FIG. 17, the load of the example spring assembly increased at a generally steady rate from about 0.22 revolutions to about 38 revolutions of the roller tube in a retraction direction. Between about 38 revolutions and about 49 revolutions of the example spring assembly, one or more stages of the spring assembly started to become fully preloaded or wound about a sleeve of an adjacent stage, and thus the torque of the tested spring assembly increased at a greater rate relative to the rate of increase between about 0.22 revolutions and about 38 revolutions and exhibited spikes during this rotational range. Upon full winding of the example spring assembly (e.g., upon about 49 revolutions in FIG. 17), the torque in the spring assembly reached a maximum value of about 3.2 inch-pounds.

Referring still to FIG. 17, the decrease in torque of the example spring assembly depicted from the upper-right corner to the bottom-left corner of the lower line of the graph represents the load of the spring assembly during extension of an associated shade, such as the first and/or second shades 22, 24, from a fully-wound position of the spring assembly to a fully-unwound position of the spring assembly. During extension of the associated shade, the example spring assembly assisted the deployment of the shade by exerting a rotational force on the roller tube, and thus the load of the spring assembly decreased during extension of the associated shade. During extension of the associated shade from the fully wound position of the example spring assembly (upper-right corner of the graph), the spring assembly initially exhibited a sharp decrease in output torque from about 3.2 inch-pounds to about 0.8 inch-pounds over about one-quarter of a revolution in an unwinding direction. This sharp decrease in load was based on the unwinding of the springs of the example spring assembly from a fully-wound configuration. After the sharp decrease in load, the output torque of the example spring assembly decreased at a generally steady rate until the springs of the spring assembly returned to a fully-unwound configuration in which the springs had about zero turns of preload (bottom-left corner of the graph).

Referring still to FIG. 17, the example spring assembly exhibited a small amount of hysteresis. As shown in FIG. 17, a higher rotational force was required to wind the example spring assembly than the spring assembly exhibited during unwinding (represented by the vertical offset between the upper and lower lines in FIG. 17). The extra load may be due to internal friction of the example spring assembly. For example, the area between the winding line (upper line in FIG. 17) and the unwinding line (lower line in FIG. 17) may represent the energy dissipated due to internal friction. In FIG. 17, the winding and unwinding lines are separated by about 0.2 inch-pounds over a majority of the travel of the example spring assembly, representing a relatively small amount of hysteresis.

The foregoing description has broad application. While the provided embodiments include a silhouette-type shade and a black-out type shade, it should be appreciated that the concepts disclosed herein may equally apply to many types of shades. Additionally, or alternatively, while the provided embodiments include a dual roller unit, it should be appreciated the multi-stage spring assembly may be used in single roller configurations or other multi-roller units. For example, the multi-stage spring assembly may be used in connection with a single roller and a single shade attached to the single roller. Additionally, or alternatively, while the provided embodiments generally describe the multiple stage spring assembly as assisting deployment of one or more shades of an architectural covering, the multiple stage spring assembly may be oriented within the roller tube to assist retraction of one or more shades of an architectural covering. Additionally, or alternatively, while the provided embodiments generally describe the multiple stage spring assembly in connection with an architectural covering, the multiple stage spring assembly may be applicable in other circumstances needing additional spring-powered rotations or turns with a receiving space having a limited radial or transverse dimension. Accordingly, the discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation.

The term "a" or "an" entity, as used herein, refers to one or more of that entity. As such, the terms "a" (or "an"), "one or more" and "at least one" can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A multiple stage spring assembly for use with a retractable covering including a roller tube having a first end, a second end, and an interior space extending between the first and second ends, said spring assembly comprising:
    a shaft;
    a non-rotatable first member sized and adapted for positioning within the interior space of the roller tube of the retractable covering, said non-rotatable first member being non-rotatably mounted on said shaft;
    a first spring including a first end portion coupled to said non-rotatable first member, said first spring including a second end portion;
    a first housing including an interior space and a sleeve, said first spring being positioned at least partially within said interior space of said first housing, said second end portion of said first spring being coupled to said first housing so that said first housing and said second end portion of said first spring rotate in unison relative to said shaft;
    a second spring including a first end portion coupled to said sleeve of said first housing to rotate with said first housing, said second spring including a second end portion.

2. The spring assembly according to claim 1, further comprising:
    a second housing wherein said second housing includes an interior space and a sleeve, said second spring being positioned at least partially within said interior space of said second housing, said second end portion of said second spring being coupled to said second housing so that said second housing and said second end portion of said second spring rotate in unison.

3. The spring assembly according to claim 2, wherein said non-rotatable first member, said first housing, and said second housing are axially aligned with one another.

4. The spring assembly according to claim 2, wherein said first spring is positioned radially between a portion of said non-rotatable first member and a portion of said first housing.

5. The spring assembly according to claim 2, wherein said second spring is positioned radially between a portion of said sleeve of said first housing and a portion of said second housing.

6. The spring assembly according to claim 1, wherein:
    said non-rotatable first member defines an axially-extending sleeve positioned at least partially within the interior space defined by said first housing; and
    said first end portion of said first spring is coupled to said sleeve of said non-rotatable first member.

7. The spring assembly according to claim 2, wherein said sleeve of said first housing is positioned at least partially within the interior space defined by said second housing.

8. The spring assembly according to claim 2, wherein said second housing has a larger outer dimension than said non-rotatable first member and said first housing.

9. The spring assembly according to claim 2, wherein said first spring and said second spring are torsion springs that are axially aligned with each other.

10. A multiple stage spring assembly, comprising:
    a shaft;
    a non-rotatable first member sized and adapted for positioning within an interior space of a roller tube of an architectural covering, said non-rotatable first member being non-rotatably mounted on said shaft;
    a first stage including an opening for receiving a portion of said non-rotatable first member and said shaft, said first stage including a first spring and a first housing; wherein:
        said first spring includes a first tang and a second tang, said first tang non-rotatably coupled to said non-rotatable first member, said second tang rotationally movable relative to said shaft; and
        said first housing includes an inner surface defining an interior space and a sleeve, said first spring being positioned at least partially within said interior space of said first housing, said second tang of said first spring being coupled to said inner surface of said first housing so that said first housing and said second tang of said first spring rotate in unison;
    a second stage including an opening for receiving a portion of said shaft and said sleeve of said first housing, said second stage including a second spring; wherein:
        said second spring includes a first tang and a second tang, wherein:
            said first tang of said second spring is operably coupled to said sleeve of said first housing such that said first tang of said second spring, said first housing, and said second tang of said first spring rotate together about said shaft; and said second tang of said second spring is rotationally movable relative to said first tang of said second spring.

11. The spring assembly according to claim 10, wherein said second stage is coupled to said shaft via said first stage and is positioned axially adjacent said first stage.

12. The spring assembly according to claim 10, wherein:
said second stage further includes a second housing non-rotatably coupled to said second tang of said second spring.

13. The spring assembly according to claim 10, further comprising an intermediate stage coupled to said first stage and said second stage, said intermediate stage including an opening for receiving a portion of said shaft.

14. The spring assembly according to claim 1, wherein:
said first end portions of said first and second springs comprise inner end portions of said first and second springs; and
said second end portions of said first and second springs comprise outer end portions of said first and second springs.

15. The spring assembly according to claim 10, wherein:
said first tangs of said first and second springs comprise inner tangs of said first and second springs; and
said second tangs of said first and second springs comprise outer tangs of said first and second springs.

16. The spring assembly according to claim 8, wherein said non-rotatable first member has a diameter, said diameter of said non-rotatable first member being less than said outer dimension of said second housing.

17. A multiple stage spring assembly, comprising:
a shaft extending through the multiple stage spring assembly;
a first stage mounted on said shaft, said first stage including a first housing and a first spring, said first housing including an interior space for receiving at least a portion of said first spring, said first housing including a sleeve, said first spring having an inner tang and an outer tang, said inner tang being non-rotatably coupled to said shaft, said outer tang being rotationally movable relative to said shaft; and
a second stage mounted on said shaft, said second stage including a second housing and a second spring, said second housing including an interior space for receiving at least a portion of said second spring, said second spring having an inner tang and an outer tang, said inner tang of said second spring operably coupled to said sleeve of said first housing such that said inner tang of said second spring, said first housing, and said outer tang of said first spring rotate together about said shaft, said outer tang of said second spring rotationally movable relative to said inner tang of said second spring.

18. The spring assembly according to claim 17, wherein:
said outer tang of said first spring is non-rotatably coupled to an inner surface of said first housing and said inner tang of said second spring is operably coupled to an outer surface of said sleeve of said first housing.

19. The spring assembly according to claim 10, wherein said second stage is coupled to the roller tube.

20. The spring assembly according to claim 1, wherein said non-rotatable first member includes a sleeve and a flange extending radially outwardly from an end of said sleeve, said first end portion of said first spring being coupled to said sleeve of said first member.

21. The spring assembly according to claim 20, wherein said sleeve of said non-rotatable first member includes an internal bore configured to receive a portion of said shaft, said non-rotatable first member being keyed to said shaft.

22. The spring assembly according to claim 20, wherein said sleeve of said non-rotatable first member includes an external groove for coupling to said first end portion of said first spring.

23. The spring assembly according to claim 1, wherein said first end portion of said first spring is coupled to said non-rotatable first member at a position between the first and second ends of the roller tube.

24. The spring assembly according to claim 1, wherein said second end portion of said first spring is coupled to a cavity formed in an inner surface defining said interior space of said first housing.

* * * * *